US009014763B2

(12) United States Patent
Jung

(10) Patent No.: US 9,014,763 B2
(45) Date of Patent: Apr. 21, 2015

(54) MOBILE TERMINAL AND CONTROLLING METHOD THEREOF

(71) Applicant: LG Electronics Inc., Seoul (KR)

(72) Inventor: Juyung Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 180 days.

(21) Appl. No.: 13/867,643

(22) Filed: Apr. 22, 2013

(65) Prior Publication Data

US 2014/0199947 A1 Jul. 17, 2014

(30) Foreign Application Priority Data

Jan. 11, 2013 (KR) ........................ 10-2013-0003373

(51) Int. Cl.
*H04M 1/00* (2006.01)
*H04B 7/26* (2006.01)
*G06F 3/14* (2006.01)
*G06F 3/0485* (2013.01)
*H04M 1/725* (2006.01)

(52) U.S. Cl.
CPC ................ *H04B 7/26* (2013.01); *G06F 3/1454* (2013.01); *G06F 3/0485* (2013.01); *H04M 1/7253* (2013.01); *G09G 2340/145* (2013.01); *H04M 2250/16* (2013.01); *H04M 2250/22* (2013.01)

(58) Field of Classification Search
USPC ............................ 715/864, 702; 345/173, 1.1
See application file for complete search history.

(56) References Cited

U.S. PATENT DOCUMENTS

| 4,602,251 | A  | * | 7/1986  | Sawada et al. ................ 345/590 |
| 4,710,762 | A  | * | 12/1987 | Yamada ........................ 345/536 |
| 5,742,352 | A  | * | 4/1998  | Tsukagoshi ................... 348/468 |
| 7,111,044 | B2 | * | 9/2006  | Lee .............................. 709/204 |
| 8,660,545 | B1 | * | 2/2014  | Redford et al. ............... 455/418 |
| 8,758,111 | B2 | * | 6/2014  | Lutnick .......................... 463/16 |

(Continued)

FOREIGN PATENT DOCUMENTS

| DE | 10-2008-028636 | 12/2009 |
| DE | 10-2010-052244 | 5/2012 |

(Continued)

OTHER PUBLICATIONS

European Patent Office Application Serial No. 13168833.5, Search Report dated Apr. 8, 2014, 7 pages.

*Primary Examiner* — Minh D Dao

(74) *Attorney, Agent, or Firm* — Lee, Hong, Degerman, Kang & Waimey

(57) ABSTRACT

A mobile terminal and controlling method thereof are disclosed, which enables a user to keep watching contents via a communication-connected external device by transmitting real-time video data displayed on a play region to the external device despite that the play region in part disappears from a screen including the play region of the content.

The present invention includes a display unit configured to display a screen including a play region for at least one content, a wireless communication unit configured to establish wireless communication with at least one external device, the wireless communication unit configured to transmit video data displayed on the play region to the at least one external device in order to display the transmitted video data, a controller configured to control the wireless communication unit to transmit the video data to the at least one external device in real time if a portion of the play region disappears from the screen in response to a scroll of the screen.

20 Claims, 30 Drawing Sheets

(56) References Cited

U.S. PATENT DOCUMENTS

| | | | |
|---|---|---|---|
| 2002/0158811 A1* | 10/2002 | Davis | 345/1.1 |
| 2002/0167540 A1* | 11/2002 | Dobbelaar | 345/716 |
| 2002/0196268 A1* | 12/2002 | Wolff et al. | 345/718 |
| 2005/0195221 A1* | 9/2005 | Berger et al. | 345/660 |
| 2008/0060006 A1* | 3/2008 | Shanks et al. | 725/38 |
| 2008/0216113 A1* | 9/2008 | Yun et al. | 725/33 |
| 2009/0093300 A1* | 4/2009 | Lutnick et al. | 463/26 |
| 2009/0138907 A1* | 5/2009 | Wiser et al. | 725/34 |
| 2010/0097322 A1* | 4/2010 | Hu et al. | 345/173 |
| 2010/0115559 A1* | 5/2010 | Ellis | 725/53 |
| 2010/0293508 A1* | 11/2010 | Hwang et al. | 715/846 |
| 2011/0096230 A1 | 4/2011 | Komiya et al. | |
| 2011/0235998 A1* | 9/2011 | Pond et al. | 386/280 |
| 2013/0086206 A1* | 4/2013 | Sultenfuss et al. | 709/217 |
| 2013/0263169 A1* | 10/2013 | Pedlow et al. | 725/16 |
| 2013/0342638 A1* | 12/2013 | Sobti et al. | 348/14.08 |
| 2014/0067131 A1* | 3/2014 | Park et al. | 700/275 |
| 2014/0201636 A1* | 7/2014 | Freitas et al. | 715/719 |
| 2014/0215336 A1* | 7/2014 | Gardenfors et al. | 715/719 |
| 2014/0245368 A1* | 8/2014 | Park et al. | 725/110 |
| 2014/0327630 A1* | 11/2014 | Burr et al. | 345/173 |

FOREIGN PATENT DOCUMENTS

| | | |
|---|---|---|
| EP | 2385689 | 11/2011 |
| EP | 2464084 | 6/2012 |

* cited by examiner

FIG. 4
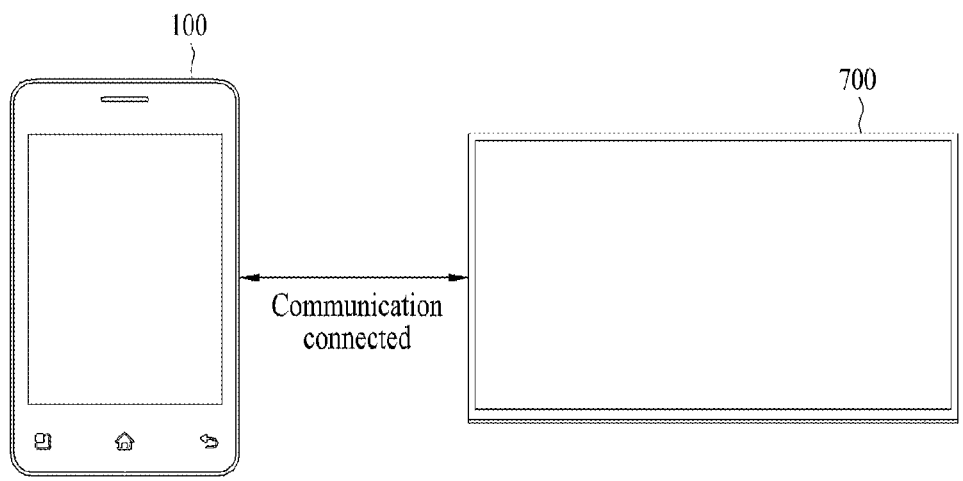
(a)
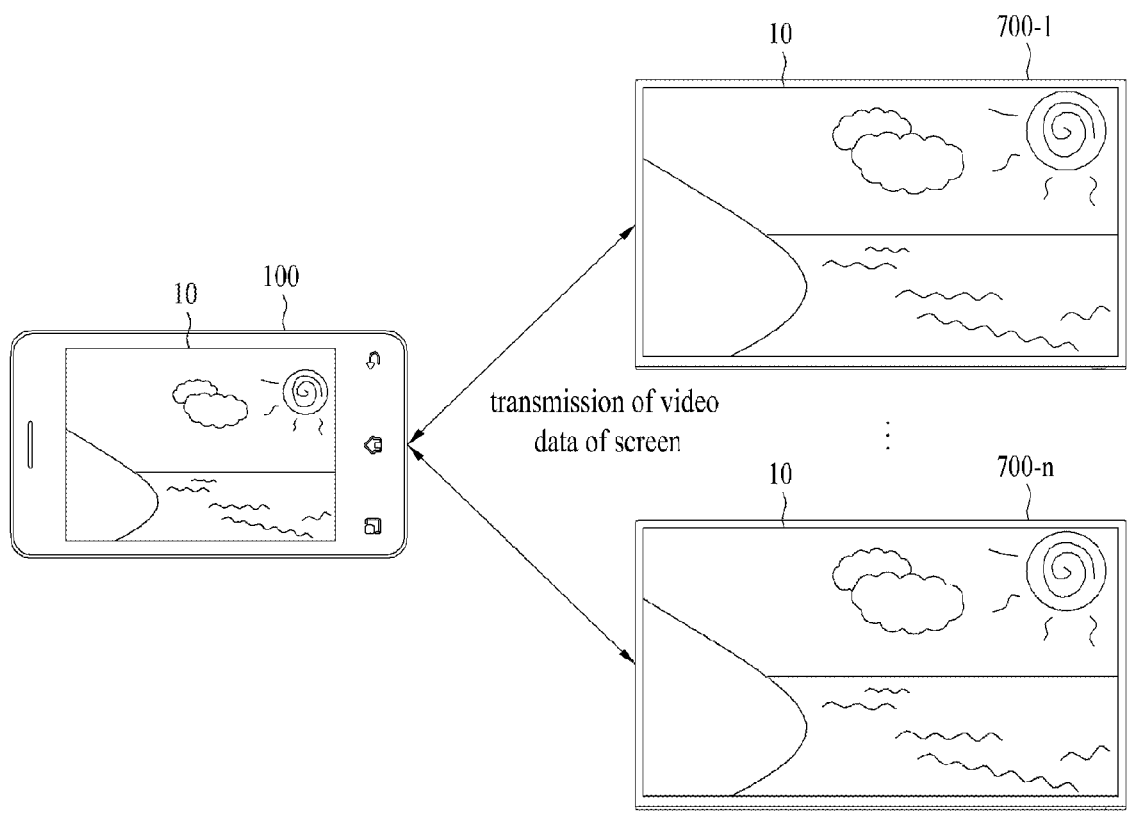
(b)

FIG. 8
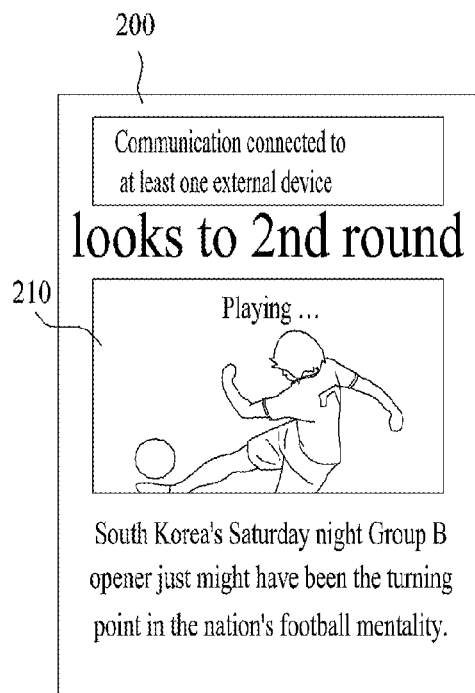
(a)
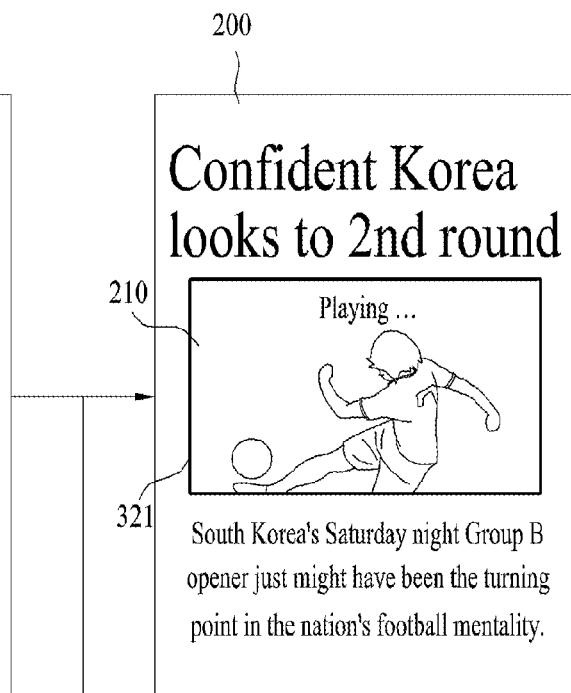
(b)
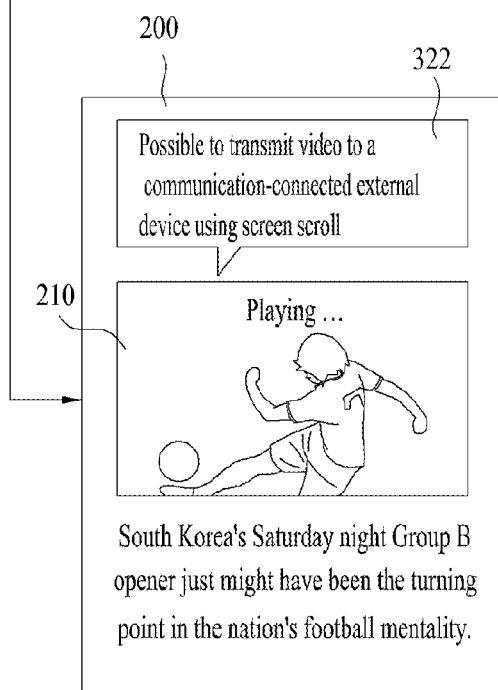
(c)

FIG. 10
(a)
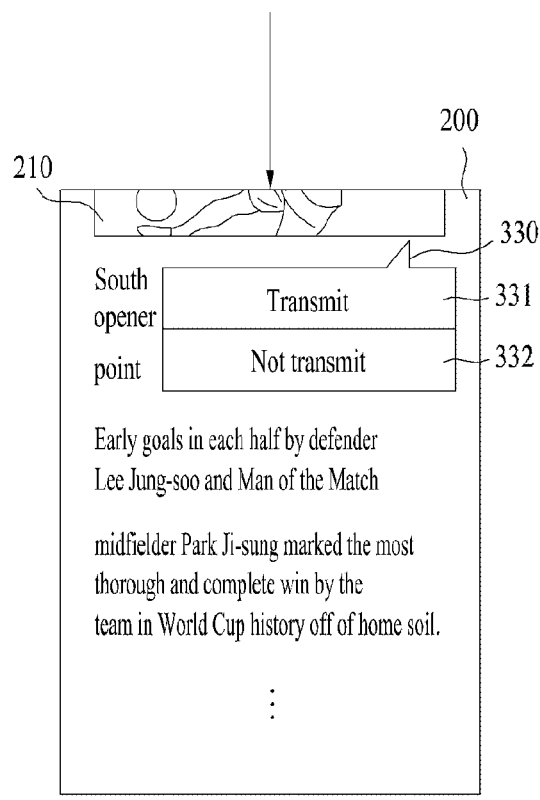
(b)

FIG. 13
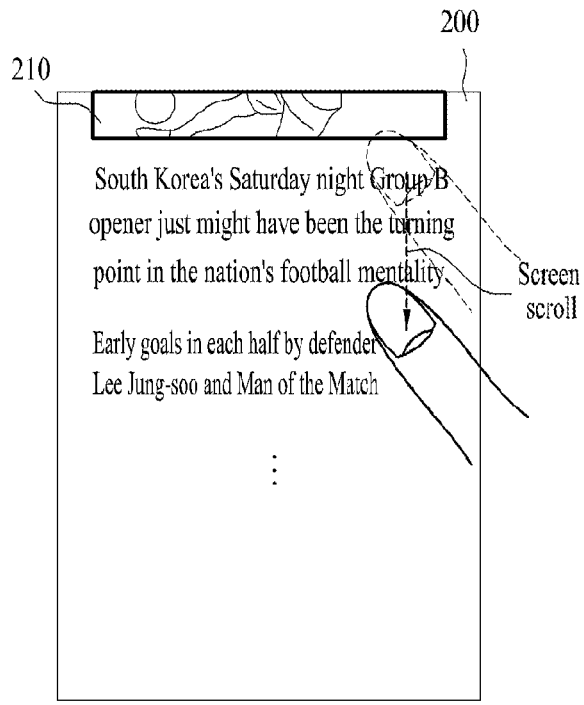
(a)
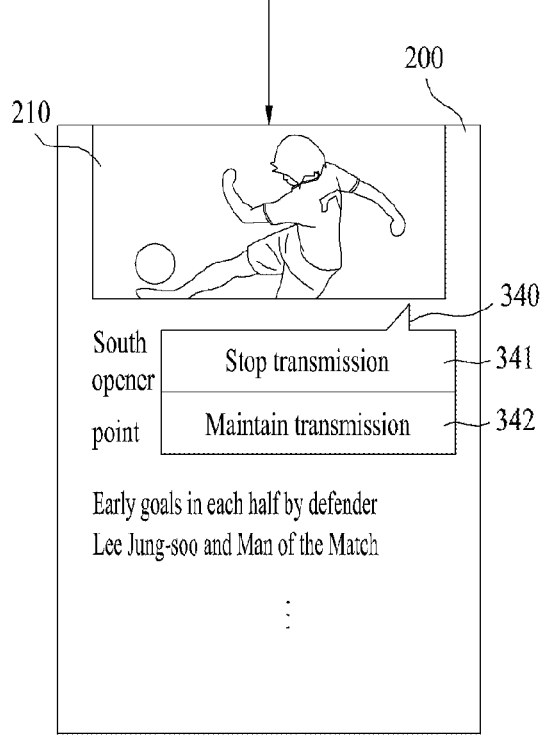
(b)

FIG. 14
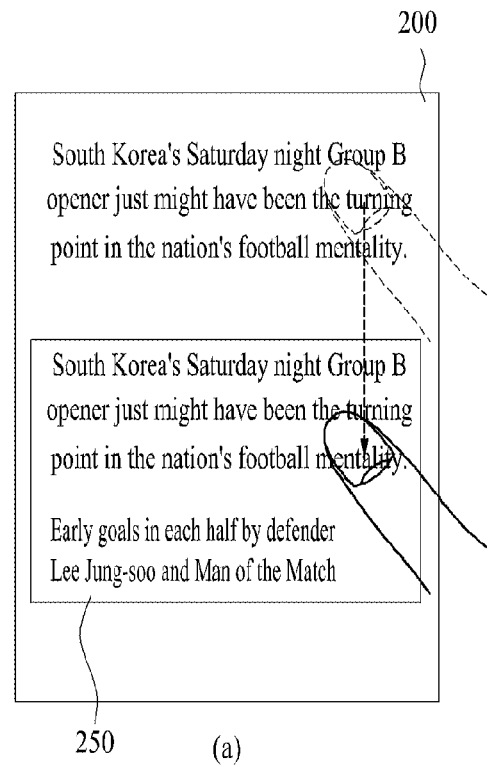
(a)
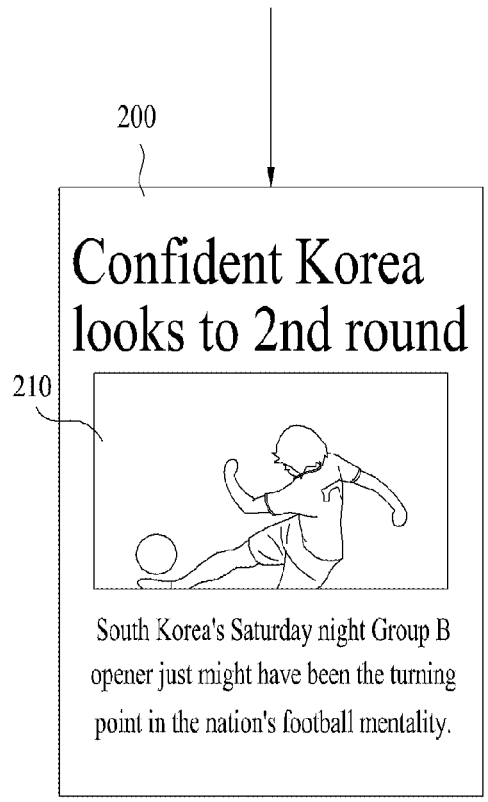
(b)

FIG. 15
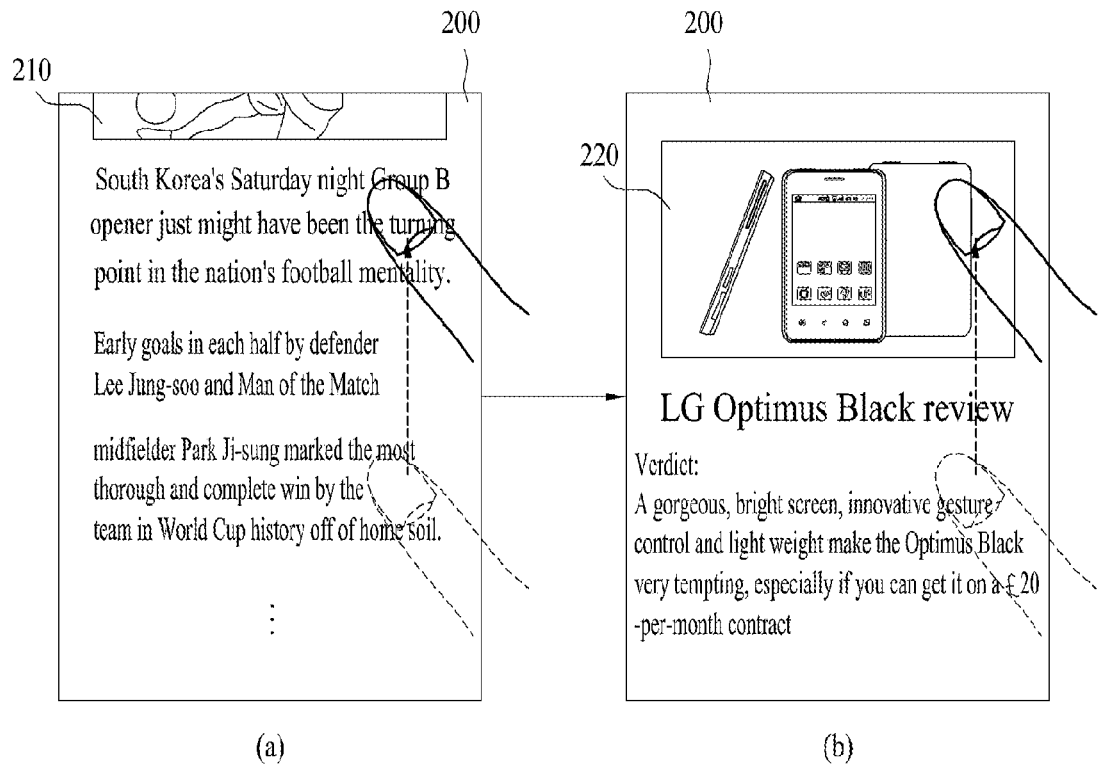
(a)   (b)
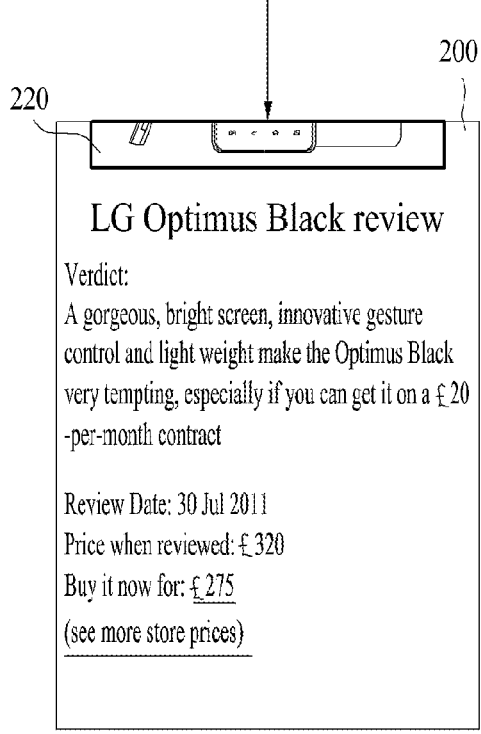
(c)

FIG. 16
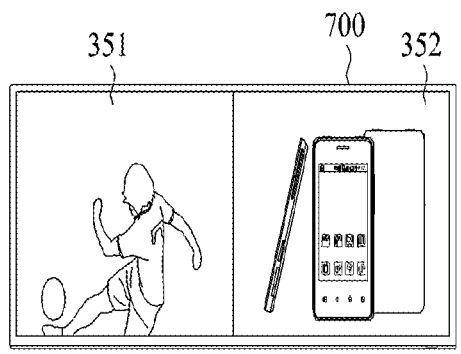
(a)
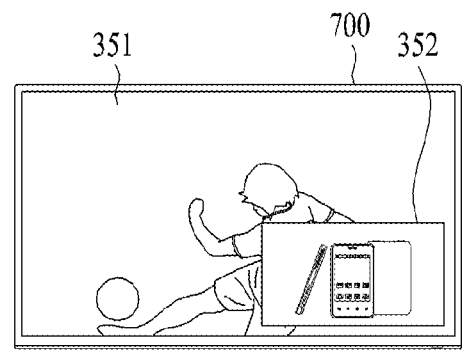
(b)
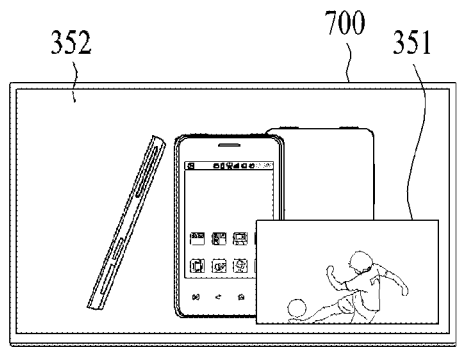
(c)

FIG. 17
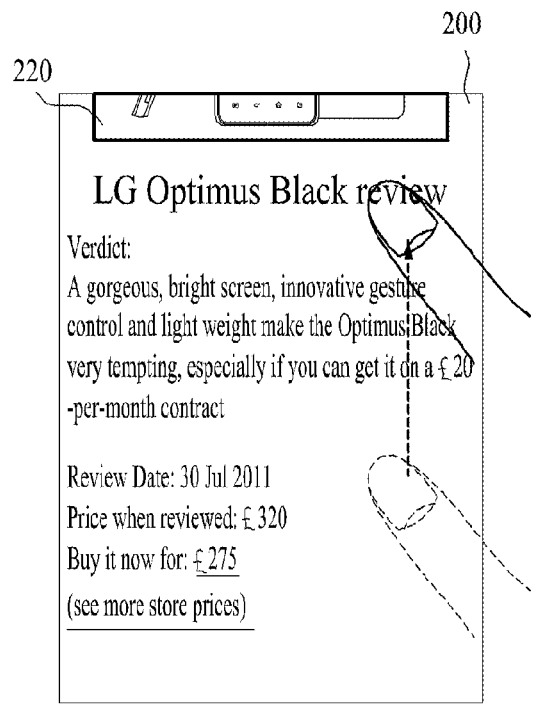
(a)
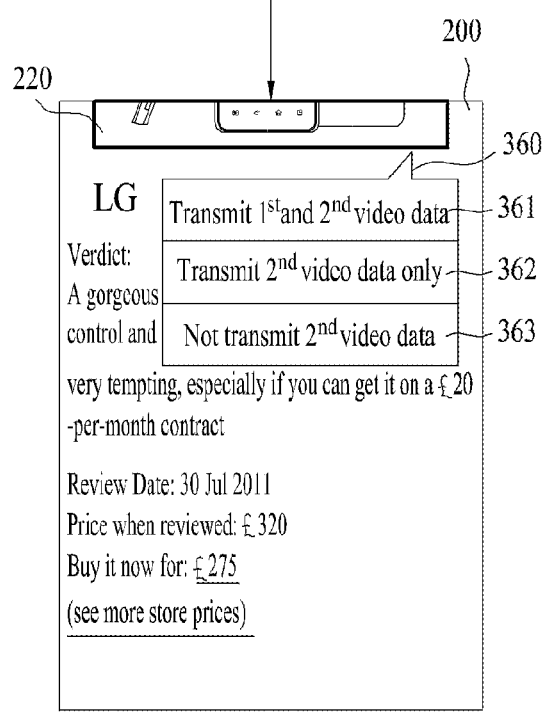
(b)

FIG. 19
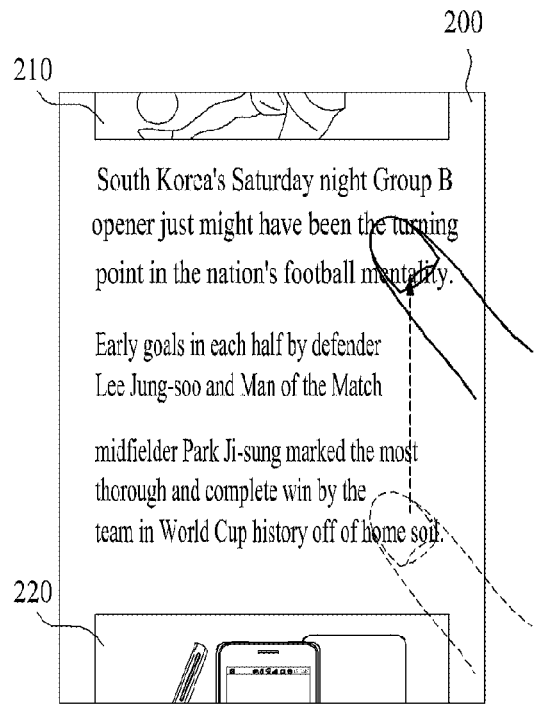
(a)
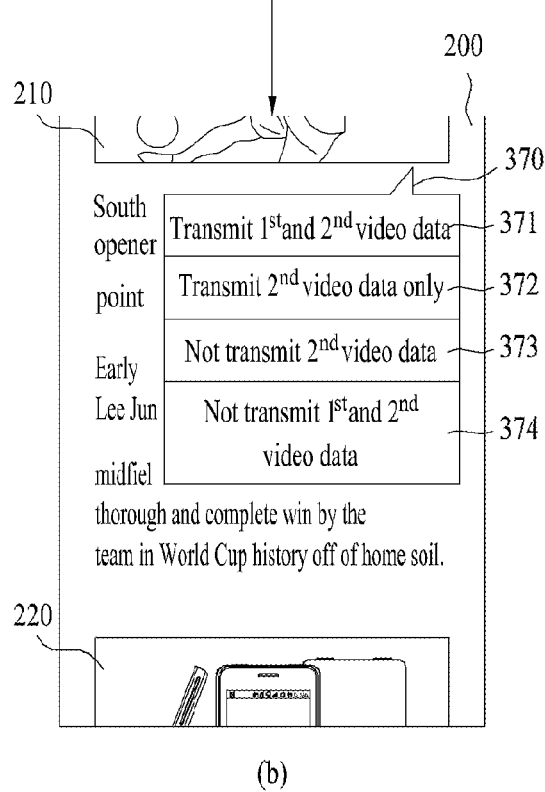
(b)

FIG. 21
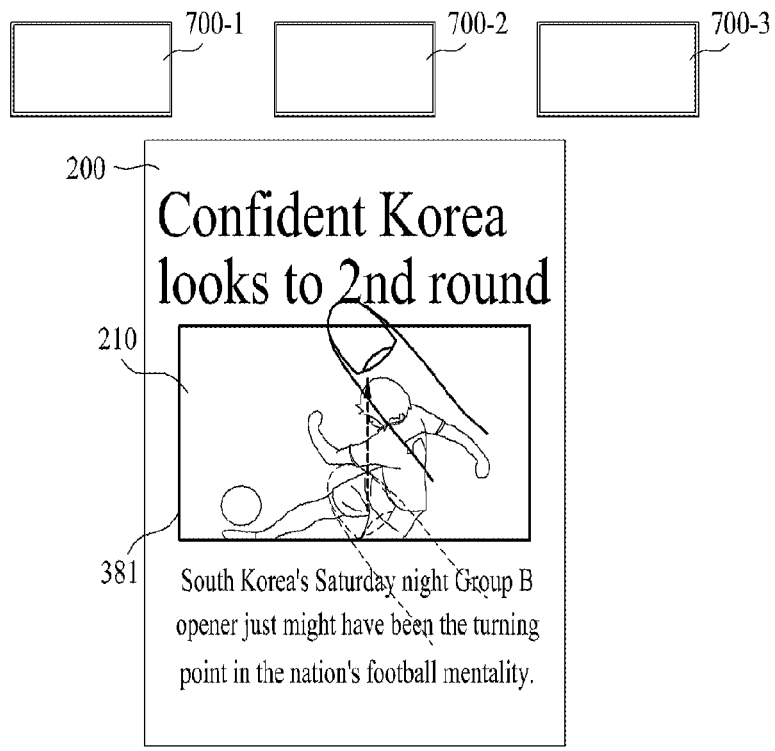
(a)
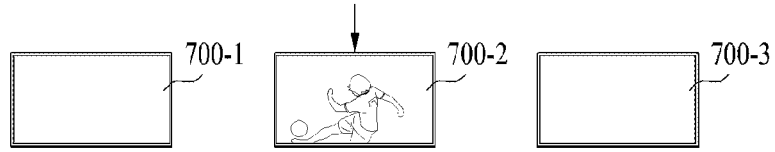
(b)

FIG. 30
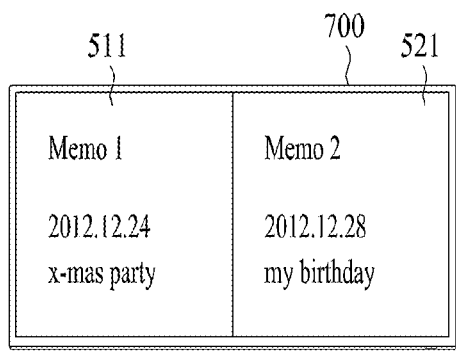
(a)
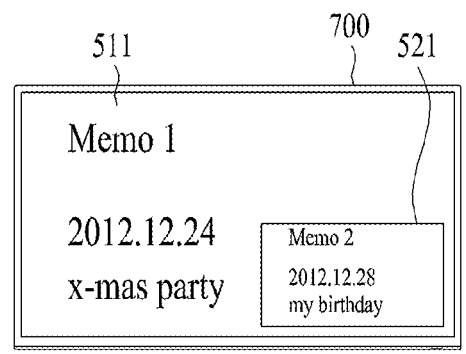
(b)
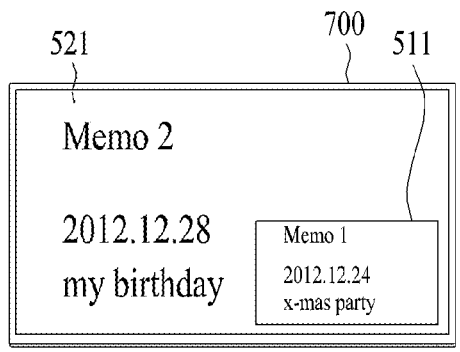
(c)

MOBILE TERMINAL AND CONTROLLING METHOD THEREOF

Pursuant to 35 U.S.C. §119(a), this application claims the benefit of earlier filing date and right of priority to Korean Application No. 10-2013-0003373, filed on Jan. 11, 2013, the contents of which are hereby incorporated by reference herein in their entirety.

BACKGROUND OF THE INVENTION

1. Field of the Invention

The present invention relates to a mobile terminal, and more particularly, to a mobile terminal and a method of controlling the mobile terminal.

2. Discussion of the Related Art

A mobile terminal is a device that can be configured to perform various functions, such as data and voice communications, capturing still images and video via a camera, recording audio, playing music files and outputting music via a speaker system, and displaying images and video on a display. Some terminals include additional functionality to support game playing, while other terminals are also configured as multimedia players. More recently, mobile terminals have been configured to receive broadcast and multicast signals to permit viewing of content, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Such a mobile terminal as a smart phone and the like provides a web browser and a user is then able to access a desired webpage via the web browser.

In doing so, a text and a video play region for displaying a video related to the text may be included in the webpage. And, the user is able to watch a video related to a current text via the video play region.

However, if the user intends to watch another text within a webpage screen by scrolling the webpage screen in top or bottom direction while watching a video, as the webpage screen is scrolled, the video play region may disappear from the webpage screen entirely or in part. Therefore, it may cause a problem that the user is unable to keep watching the video.

SUMMARY OF THE INVENTION

Accordingly, embodiments of the present invention are directed to a mobile terminal and controlling method thereof that substantially obviate one or more problems due to limitations and disadvantages of the related art.

An object of the present invention is to provide a mobile terminal and controlling method thereof, which enables a user to keep watching a content via a communication-connected external device by transmitting real-time video data displayed on a play region to the external device despite that a portion of the play region disappears from a screen including the play region of the content.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to the present invention may include a display unit configured to display a screen including a play region for at least one content, a wireless communication unit configured to establish wireless communication with at least one external device, the wireless communication unit configured to transmit video data displayed on the play region to the at least one external device in order to display the transmitted video data, a controller configured to control the wireless communication unit to transmit the video data to the at least one external device in real time if a portion of the play region disappears from the screen in response to a scroll of the screen.

In another aspect of the present invention, a method of controlling a mobile terminal according to the present invention may include the steps of displaying a screen including a play region for at least one content comprising video data, establishing a communication with at least one external device, detecting whether a portion of the play region disappears from the screen in response to a scroll of the screen, transmitting the video data to the at least one external device in real time in response to the portion of the play region disappearing in order to enable the external device to display the video data.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 4 is a diagram to describe a system including a mobile terminal according to the present invention and at least one external device;

FIGS. 6 to 30 are diagrams to describe an operating process of a mobile terminal according to the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

The terms "module," "unit," and "part" are used herein with respect to various elements only to facilitate disclosure of the invention. Therefore, the terms "module," "unit," and "part" are used interchangeably herein.

The present invention can be applied to various types of terminals. For example, the terminals can include mobile terminals as well as stationary terminals, such as mobile phones, user equipments, smart phones, digital televisions (DTVs), computers, digital broadcast terminals, personal digital assistants, portable multimedia players (PMP) and navigators.

For ease of description, the present invention will be described with respect to a mobile terminal 100 shown in FIGS. 1 through 2B. However, it should be understood that the present invention can also be applied to other types of terminals.

Figure 1:
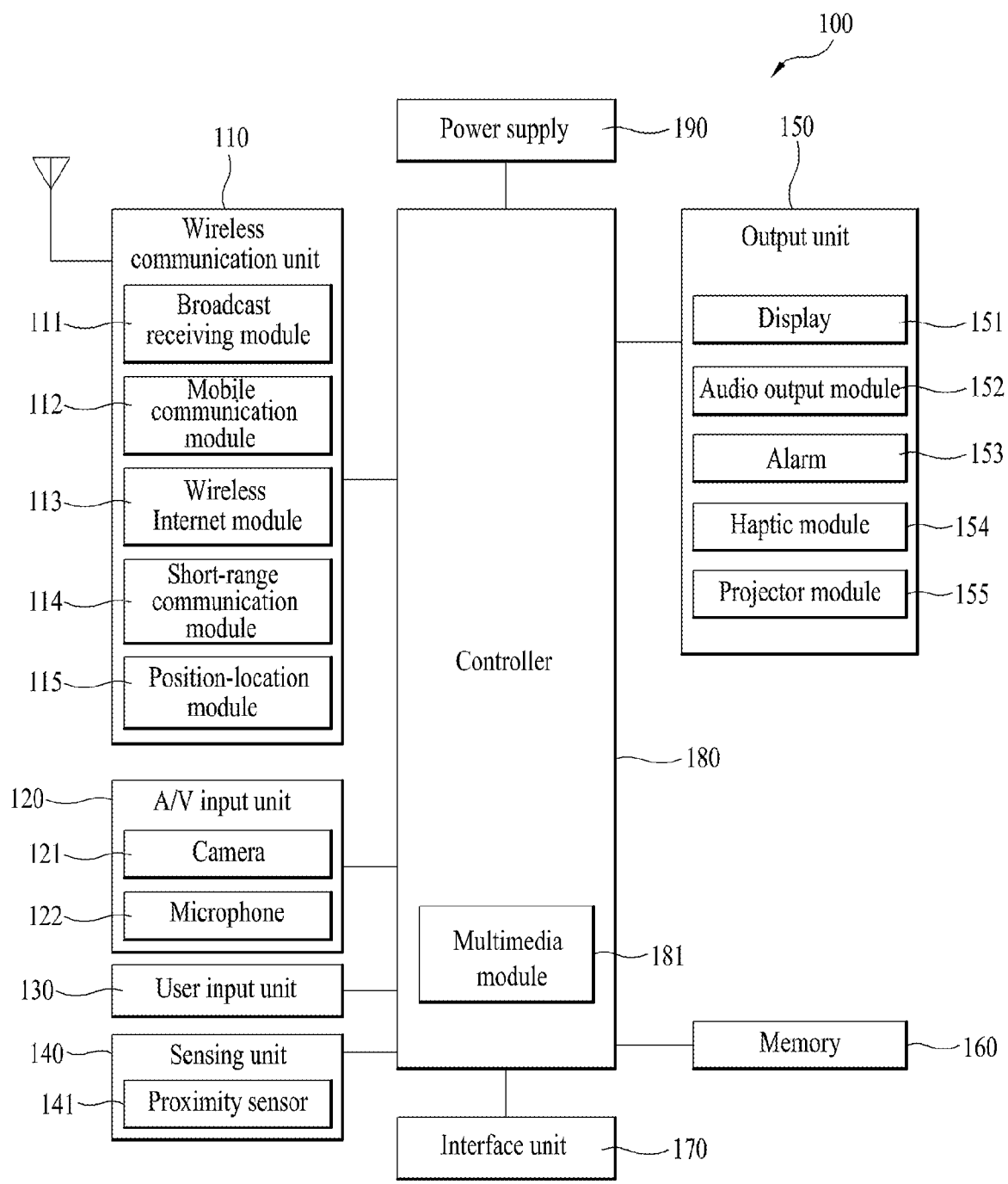
FIG. 1 illustrates a block diagram of a mobile terminal in accordance with one embodiment of the present invention.

FIG. 1 illustrates an exemplary block diagram of the mobile terminal 100 in accordance with one embodiment of the present invention. It should be understood that embodiments, configurations and arrangements other than that depicted in FIG. 1 can be used without departing from the spirit and scope of the invention. As shown in FIG. 1, the mobile terminal 100 includes a wireless communication unit 110, an audio/video (AV) input unit 120, a user input unit 130, a sensing unit 140, an output unit 150, a memory 160, an interface unit 170, a controller 180, and a power supply unit 190. It should be understood that the mobile terminal 100 may include additional or fewer components than those shown in FIG. 1.

The wireless communication unit 110 can include one or more components for allowing wireless communication between the mobile terminal 100 and a wireless communication system or network within which the mobile terminal 100 is located. For example, the wireless communication unit 110 can include a broadcast receiving module 111, a mobile communication module 112, a wireless Internet module 113, a short-range communication module 114, and a position-location module 115.

The wireless communication unit 100 connects communication with at least one or two external devices and is then able to transmit video data displayed on a video play region within a screen by real time to enable the at least one or two external devices to display the video data displayed on the video play region within the screen.

The broadcast receiving module 111 receives a broadcast signal and/or broadcast related information from an external broadcast management server via a broadcast channel. In one embodiment, the mobile terminal 100 can be configured to include two or more broadcast receiving modules 111 to enable simultaneous reception of two or more broadcast channels or to facilitate switching of broadcast channels.

The broadcast channel can include a satellite channel and a terrestrial channel. The broadcast management server can be a server that generates and transmits a broadcast signal and/or broadcast related information, or a server that receives a previously-generated broadcasting signal and/or previously-generated broadcasting-related information and transmits the previously-generated broadcast signal and/or previously-generated broadcasting-related information to the mobile terminal 100.

For example, the broadcast signal can be implemented as a TV broadcast signal, a radio broadcast signal, a data broadcast signal, and various other types of signals. In one embodiment, the broadcast signal can include a combination of the broadcast signal and a TV broadcast signal or a combination of the broadcast signal and a radio broadcast signal.

The broadcast-related information can include broadcast channel information, broadcast program information, or broadcast service provider information. The broadcast-related information can be provided to the mobile terminal 100 through a mobile communication network. In such a case, the broadcast-related information can be received by the mobile communication module 112.

The broadcast-related information can be implemented in various forms. For example, the broadcast-related information can have the form of an electronic program guide (EPG) of the digital multimedia broadcasting (DMB) standard, or an electronic service guide (ESG) of the digital video broadcast-handheld (DVB-H) standard.

The broadcast receiving module 111 can be configured to receive broadcast signals transmitted from various types of broadcast systems, such as digital multimedia broadcasting-terrestrial (DMB-T), digital multimedia broadcasting-satellite (DMB-S), DVB-H, digital video broadcast-convergence of broadcast and mobile services (DVB-CBMS), Open Mobile Alliance broadcast (OMA-BCAST), the data broadcasting system known as media forward link only (MediaFLO®) and integrated services digital broadcast-terrestrial (ISDB-T) systems. The broadcast receiving module 111 can be configured to receive signals from broadcasting systems providing broadcasting signals other than the above-described digital broadcasting systems. The broadcast signal and/or broadcast-related information received via the broadcast receiving module 111 can be stored in a storage medium, such as the memory 160.

The mobile communication module 112 can transmit and/or receive wireless signals to and/or from at least one network entity, such as a base station, an external terminal, or a server. For example, such wireless signals can include audio, video, and data according to a transmission and reception of text/multimedia messages.

The mobile communication module 112 connects communication with at least one or two external devices and is then able to transmit video data displayed on a video play region within a screen by real time to enable the at least one or two external devices to display the video data displayed on the video play region within the screen.

The wireless Internet module 113 can be a module that supports Internet access for the mobile terminal 100. For example, the wireless Internet module 113 can be included in the mobile terminal 100 or installed in an external device that is coupled to the mobile terminal 100. For example, the wireless Internet technology implemented by the wireless Internet module 113 can be a wireless local area network (WLAN), Wi-Fi, Wireless Broadband (WiBro™), World Interoperability for Microwave Access (WiMAX™), or High Speed Downlink Packet Access (HSDPA).

Moreover, as mentioned in the foregoing description, the wireless internet module 113 can receive or download the data relevant to the area, in which the mobile terminal 100 is located, from the external server.

The wireless internet module 113 connects communication with at least one or two external devices and is then able to transmit video data displayed on a video play region within a screen by real time to enable the at least one or two external devices to display the video data displayed on the video play region within the screen.

The short-range communication module 114 can be a module for supporting relatively short-range communications. For example, the short-range communication module 114 can be configured to communicate using short range communication technology, such as, radio frequency identification (RFID), Infrared Data Association (IrDA), or Ultra-wideband (UWB), as well as networking technologies, such as Bluetooth™ ZigBee™ or Digital Living Network Alliance (DLNA).

The short-range communication module 114 connects communication with at least one or two external devices via one of Bluetooth, RFID, infrared communication, UWB, ZigBee, DLNA and the like and is then able to transmit video data displayed on a video play region within a screen by real time to enable the at least one or two external devices to display the video data displayed on the video play region within the screen.

The position-location module 115 identifies or otherwise obtains the location of the mobile terminal 100. In one embodiment, the position-location module 115 can include a global positioning system (GPS) module.

The A/V input unit 120 can be used to input an audio signal or a video signal, and can include a camera 121 and a microphone 122. For example, the camera 121 can have a digital zoom feature and can process image frames of still images or video obtained by an image sensor of the camera 121 in a video call mode or a photographing mode. The processed image frames can be displayed on a display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 can receive an external audio signal while operating in a particular mode, such as a phone call mode, a recording mode or a voice recognition mode, and can process the received audio signal into electrical audio data. The audio data can then be converted into a form that can be transmitted to a mobile communication base station through the mobile communication module 112 in the call mode. The microphone 122 can apply various noise removal or noise canceling algorithms for removing or reducing noise generated when the external audio signal is received.

The user input unit 130 can generate input data in response to user manipulation of a corresponding input device or devices, such as a keypad, a dome switch, a touchpad, a jog wheel, or a jog switch. In one embodiment, the touchpad can be configured as a static pressure or capacitance type.

The sensing unit 140 can sense a change of position of the mobile terminal 100 or a component of the mobile terminal 100, relative positioning of components of the mobile terminal 100, such as a display and keypad, whether a user touches the mobile terminal 100, an orientation of the mobile terminal 100, acceleration or deceleration of the mobile terminal 100, and a current state of the mobile terminal 100, such as an open or close state. The sensing unit 140 can also include a proximity sensor 141.

The sensing unit 140 can generate a sensing signal for controlling the operation of the mobile terminal 100 according to a detected status of the mobile terminal. For example, when the mobile terminal 100 is implemented as a slide type phone, the sensing unit 140 can sense whether the mobile terminal 100 is opened or closed. Further, the sensing unit 140 can sense whether the power supply 190 supplies power and whether the interface unit 170 is connected to an external device.

The output unit 150 can generate visual, auditory and/or tactile outputs and can include the display unit 151, an audio output module 152, an alarm unit 153, a haptic module 154, and a projector module 155. The display unit 151 can be configured to display information processed by the mobile terminal 100.

For example, when the mobile terminal 100 is in a call mode, the display unit 151 can display a user interface (UI) or a graphic user interface (GUI) for placing, conducting, and terminating a call. For example, when the mobile terminal 100 is in the video call mode or the photographing mode, the display unit 151 can additionally or alternatively display images which are associated with such modes, the UI or the GUI.

The display unit 151 can be implemented using display technologies including, for example, a liquid crystal display (LCD), a thin film transistor-liquid crystal display (TFT-LCD), an organic light-emitting diode display (OLED), a flexible display and a three-dimensional display. The mobile terminal 100 can be configured to include more than one display unit 151 according to the configuration of the mobile terminal 100.

For example, the mobile terminal 100 can include a number of display units 151 that are arranged on a single face of the mobile terminal 100, and can be spaced apart from one another or integrated in one body. The number of display units 151 can also be arranged on different sides of the mobile terminal 100.

In one embodiment, the display used in the display unit 151 can be of a transparent type or a light transmittive type, such that the display unit 151 is implemented as a transparent display. For example, the transparent display can include a transparent OLED (TOLED) display. The rear structure of the display unit 151 can also be of a light transmittive type. Accordingly, a user may see an object located behind the body of the mobile terminal 100 through the transparent area of the body of the mobile terminal 100 that is occupied by the display unit 151.

When the display unit 151 and a sensor for sensing a user touch (hereinafter referred to as a "touch sensor") are configured as a layered structure to form a touch screen, the display unit 151 can be used as an input device in addition to an output device. For example, the touch sensor can be in the form of a touch film, a touch sheet, or a touch pad.

The touch sensor can convert a variation in pressure applied to a specific portion of the display unit 151 or a variation in capacitance generated at a specific portion of the display unit 151 into an electric input signal. The touch sensor can sense pressure resulting from a touch, as well as the position and area of the touch.

When the user applies a touch input to the touch sensor, a signal corresponding to the touch input can be transmitted to a touch controller (not shown). The touch controller can process the signal and transmit data corresponding to the processed signal to the controller 180. The controller 180 can then use the data to detect a touched portion of the display unit 151.

The proximity sensor 141 of the sensing unit 140 can be located in an internal region of the mobile terminal 100 and either enclosed by the touch screen or around the touch screen. The proximity sensor 141 can sense an object approaching a prescribed detecting surface or an object located near the proximity sensor 141 without any physical contact using an electromagnetic field or infrared rays. The longevity of the proximity sensor 141 can substantially exceed the longevity of a contact sensor and, therefore, can have wide applications in the mobile terminal 100.

The proximity sensor 141 can include a transmittive photo-electric sensor, a direct reflection photo-electric sensor, a mirror reflection photo-electric sensor, a radio frequency oscillation proximity sensor, an electrostatic capacity proximity sensor, a magnetic proximity sensor, and/or an infrared proximity sensor. In one embodiment, the touch screen can include an electrostatic capacity proximity sensor, such that a proximity of a pointer can be detected through a variation in an electric field according to the proximity of the pointer. Accordingly, the touch screen or touch sensor can be classified as the proximity sensor 141.

For purposes of clarity, an action of the pointer approaching the touch screen and being recognized without actually contacting the touch screen will be herein referred to as a "proximity touch," while an action of bringing the pointer into contact with the touch screen will be herein referred to as a "contact touch." A proximity touch position of the pointer on the touch screen can correspond to a position on the touch screen from which the pointer is situated perpendicularly with respect to the touch screen.

Via the proximity sensor 141, a proximity touch and a proximity touch pattern, such as a proximity touch distance, a proximity touch duration, a proximity touch position, or a proximity touch movement state can be detected. For example, information corresponding to the detected proximity touch action and proximity touch pattern can be displayed on the touch screen.

The audio output module 152 can output audio data received from the wireless communication unit 110, or stored in the memory 160, in a call receiving mode, a call placing mode, a recording mode, a voice recognition mode, or a broadcast receiving mode. The audio output module 152 can also provide audio signals related to particular functions performed by the mobile terminal 100, such as a call received or a message received. For example, the audio output module 152 can include a speaker, a buzzer, or other audio output device.

The alarm unit 153 can output a signal for indicating the occurrence of an event of the mobile terminal 100, such as a call received event, a message received event and a touch input received event, using a vibration as well as video or audio signals. The video or audio signals can also be output via the display unit 151 or the audio output module 152. Therefore, in various embodiments, the display unit 151 or the audio output module 152 can be considered as a part of the alarm unit 153.

The haptic module 154 can generate various tactile effects that can be physically sensed by the user. For example, a tactile effect generated by the haptic module 154 can include vibration. The intensity and/or pattern of the vibration generated by the haptic module 154 can be controlled. For example, different vibrations can be combined and provided or sequentially provided.

The haptic module 154 can generate a variety of tactile effects in addition to a vibration. Such tactile effects include an effect caused by an arrangement of vertically moving pins that are in contact with the skin of the user; an effect caused by a force of air passing through an injection hole or a suction of air through a suction hole; an effect caused by skimming over the user's skin; an effect caused by contact with an electrode; an effect caused by an electrostatic force; and an effect caused by the application of cold and warm temperatures using an endothermic or exothermic device.

For example, the haptic module 154 can enable a user to sense the tactile effects through a muscle sense of the user's finger or arm, as well as to transfer the tactile effect through direct contact. Optionally, the mobile terminal 100 can include at least two haptic modules 154 according to the configuration of the mobile terminal 100.

The projector module 155 is an element for performing an image projection function of the mobile terminal 100. In one embodiment, the projector module 155 can be configured to display an image identical to or partially different from an image displayed by the display unit 151 on an external screen or wall according to a control signal of the controller 180.

For example, the projector module 155 can include a light source (not shown), such as a laser, that generates adequate light for external projection of an image, means for producing the image (not shown) to be projected via the light generated from the light source, and a lens (not shown) for enlarging the projected image according to a predetermined focus distance. The projector module 155 can further include a device (not shown) for adjusting the direction in which the image is projected by mechanically moving the lens or the entire projector module 155.

The projector module 155 can be classified as a cathode ray tube (CRT) module, a liquid crystal display (LCD) module, or a digital light processing (DLP) module according to a type of display used. For example, the DLP module operates by enabling the light generated from the light source to reflect on a digital micro-mirror device (DMD) chip and can advantageously reduce the size of the projector module 155.

The projector module 155 can preferably be configured in a lengthwise direction along a side, front or back of the mobile terminal 100. It should be understood, however, that the projector module 155 can be configured on any portion of the mobile terminal 100.

The memory 160 can store various types of data to support the processing, control, and storage requirements of the mobile terminal 100. For example, such types of data can include program instructions for applications operated by the mobile terminal 100, contact data, phone book data, messages, audio, still images, and/or moving images.

A recent use history or a cumulative usage frequency of each type of data can be stored in the memory unit 160, such as usage frequency of each phonebook, message or multimedia. Moreover, data for various patterns of vibration and/or sound output when a touch input is performed on the touch screen can be stored in the memory unit 160.

The memory 160 can be implemented using any type or combination of suitable volatile and non-volatile memory or storage devices, such as a flash memory, a hard disk type memory, a multimedia card micro type memory, a card type memory, such as a Secure Digital (SD) card or Extreme Digital (xD) card, a random access memory (RAM), a static random access memory (SRAM), a read-only memory (ROM), an erasable programmable read-only memory (EPROM), a programmable ROM (PROM), an electrically erasable programmable read-only memory (EEPROM), a magnetic memory, a magnetic disk, an optical disk, or other type of memory or data storage device. In other embodiments, the memory 160 can be a storage device that can be accessed by the mobile terminal 100 via the Internet.

The interface unit 170 can couple the mobile terminal 100 to external devices. The interface unit 170 can receive data from the external devices or power, and transmit the data or power to internal components of the mobile terminal 100. In addition, the interface unit 170 can transmit data of the mobile terminal 100 to the external devices. The interface unit 170 can include, for example, a wired or wireless headset port, an external charger port, a wired or wireless data port, a memory card port, a port for connecting a device having an identity module, an audio input/output (I/O) port, a video I/O port, and/or an earphone port.

The identity module is the chip for storing various kinds of information for authenticating the authority to use the mobile terminal 100. For example, the identity module can be a user identify module (UIM), a subscriber identify module (SIM) or a universal subscriber identify module (USIM). A device including the identity module (hereinafter referred to as "identity device") can also be manufactured in the form of a smart card. Therefore, the identity device can be connected to the mobile terminal 100 via a corresponding port of the interface unit 170.

When the mobile terminal 100 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 can control the general operations of the mobile terminal 100. For example, the controller 180 can be configured to perform control and processing associated with voice calls, data communication, and/or video calls. The controller 180 can perform pattern recognition processing to recognize a character or image from a handwriting input or a picture-drawing input performed on the touch screen.

The power supply unit 190 can be an external power source, an internal power source, or a combination thereof. The power supply unit 190 can supply power to other components in the mobile terminal 100.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For example, the procedures or functions described herein can be implemented in software using separate software modules that allow performance of at least one function or operation. Software codes can be implemented by a software application or program written in any suitable programming language. The software codes can be stored in the memory 160 and executed by the controller 180.

Figure 2A:
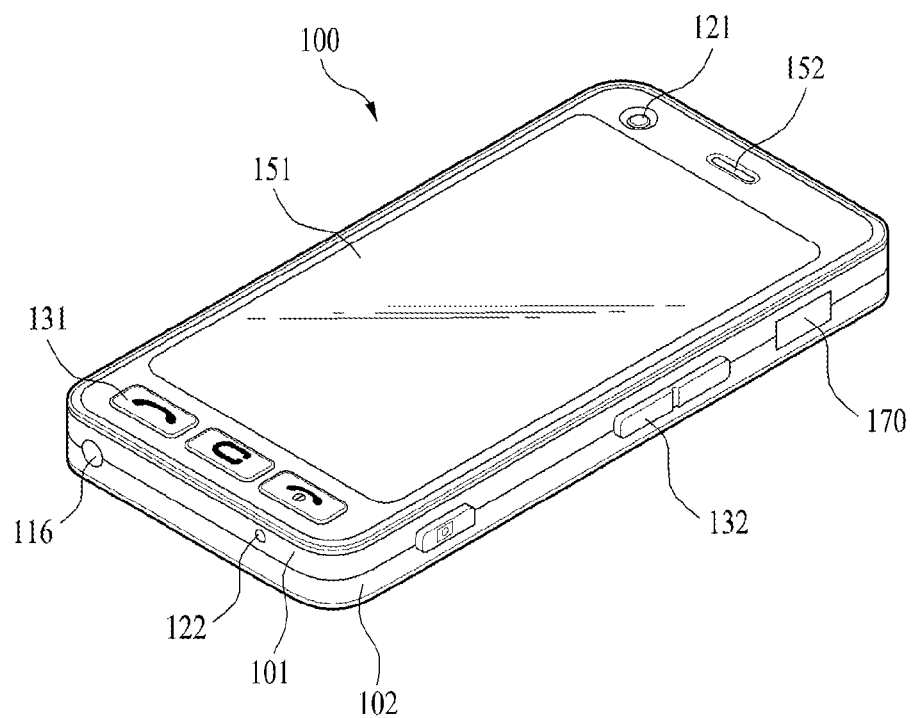
FIG. 2A is a front perspective view of the mobile terminal in accordance with one embodiment of the present invention.

FIG. 2A is a front perspective view of the mobile terminal 100 in accordance with one embodiment of the present invention. In FIG. 2A, the mobile terminal 100 is shown to have a bar type terminal body.

However, it should be understood that the mobile terminal 100 is not limited to a bar type terminal body and can have various other body types. Examples of such body types include a slide type body, folder type body, swing type body, a rotational type body, or combinations thereof. Although the disclosure herein is primarily with respect to a bar-type mobile terminal 100, it should be understood that the disclosure can be applied to other types of mobile terminals.

As shown in FIG. 2A, the case of the mobile terminal 100 (otherwise referred to as a "casing," "housing," or "cover") forming the exterior of the mobile terminal 100 can include a front case 101 and a rear case 102. Various electronic components are installed in the space between the front case 101 and the rear case 102. One or more intermediate cases can be additionally disposed between the front case 101 and the rear case 102. For example, the front case 101 and the rear case 102 can be made by injection-molding of a synthetic resin or can be made using a metal, such as stainless steel (STS) or titanium (Ti).

The display unit 151, the audio output module 152, the camera 121, user input modules 130a and 130b, the microphone 122, or the interface unit 170 can be situated on the mobile terminal 100, and specifically, on the front case 101.

As shown in FIG. 2A, for example, the display unit 151 can be configured to occupy a substantial portion of the front face 156 of the front case 101. As also shown in FIG. 2A, the audio output unit 152 and the camera 121 can be arranged in proximity to one end of the display unit 151, and the user input module 130a and the microphone 122 can be located in proximity to another end of the display unit 151. As further shown in FIG. 2A, the user input module 130b and the interface unit 170 are arranged on the sides of the front case 101 and the rear case 102, such as sides 158 and 159, respectively.

The user input unit 130 described previously with respect to FIG. 1 can be configured to receive a command for controlling an operation of the mobile terminal 100 and can include one or more user input modules 130a and 130b shown in FIG. 2A. The user input modules 130a and 130b can each be referred to as a "manipulation unit" and can be configured to employ various methods and techniques of tactile manipulation and response to facilitate operation by the user.

The user input modules 130a and 130b can be configured for inputting different commands relative to one another. For example, the user input module 130a can be configured allow a user to input such commands as "start," "end," and "scroll" to the mobile terminal 100. The user input module 130b can allow a user to input a command for adjusting the volume of the audio output unit 152 or a command for switching to a touch recognition mode of the display unit 151.

Figure 2B:
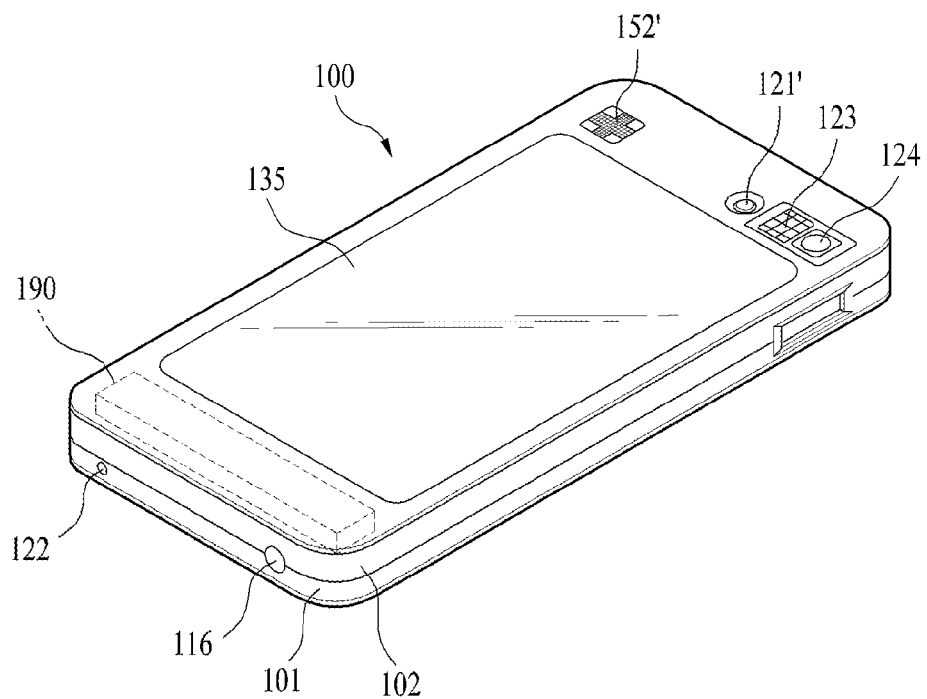
FIG. 2B is a rear perspective view of the mobile terminal in accordance with one embodiment of the present invention.

FIG. 2B is a rear perspective view of the mobile terminal 100 in accordance with one embodiment of the present invention. As shown in FIG. 2B, a camera 121-1 can be additionally located on a rear surface 161 of the rear case 102. The camera 121-1 has a direction of view that is substantially opposite to the direction of view of the camera 121 shown in FIG. 2A. The cameras 121 and 121-1 can have different resolutions, or different pixels counts, with respect to one another.

For example, the camera 121 can operate with a relatively lower resolution than the camera 121-1 in order to capture an image of the user to allow immediate transmission of the image to another user in real-time for a video call, whereas the camera 121-1 can operate with a relatively higher resolution than the camera 121 to capture images of general objects with high picture quality, which may not require immediate transmission in real-time, and may be stored for later viewing or use. For example, the cameras 121 and the camera 121-1 can be configured to rotate or to pop-up on the mobile terminal 100.

Additional camera related components, such as a flash 123 and a mirror 124, can be located adjacent to the camera 121-1. When an image of a subject is captured with the camera 121-1, the flash 123 illuminates the subject. The mirror 124 allows self-image capturing by allowing the user to see himself when the user desires to capture his own image using the camera 121-1.

The rear surface 161 of the rear case 102 can further include a second audio output module 152-1. The second audio output module 152-1 can support a stereo sound function in conjunction with the audio output module 152 shown in FIG. 2A and can be used for communication during a phone call when the mobile terminal 100 is in a speaker phone mode.

A broadcasting signal receiving antenna 116 can be additionally attached to the side of the body of the mobile terminal 100 in addition to an antenna used for telephone calls. The broadcasting signal receiving antenna 116 can form a part of the broadcast receiving module 111 shown in FIG. 1, and can be set in the body of the mobile terminal 100 such that the broadcasting signal receiving antenna can be pulled out and retracted into the body of the mobile terminal 100.

FIG. 2B shows the power supply unit 190 for providing power to the mobile terminal 100. For example, the power supply unit 190 can be situated either inside the mobile terminal 100 or detachably coupled to the mobile terminal 100.

As shown in FIG. 2B, a touch pad 135 for sensing a touch by the user can be located on the rear surface 161 of the rear case 102. In one embodiment, the touch pad 135 and the display unit 151 can be translucent such that the information displayed on display unit 151 can be output on both sides of the display unit 151 and can be viewed through the touch pad 135. The information displayed on the display unit 151 can be controlled by the touch pad 135. In another embodiment, a second display unit in addition to display unit 151 illustrated in FIG. 2A can be located on the rear surface 161 of the rear case 102 and combined with the touch pad 135 to form a touch screen on the rear case 102.

The touch pad 135 is activated by interconnecting with the display unit 151 of the front case 101. The touch pad 135 can be located in parallel with the display unit 151 and behind the display unit 151. The touch pad 135 can have the same or smaller size than the display unit 151.

In the following description, an operation of the present invention is explained in detail with reference to FIGS. 3 to 30. In particular, according to the operation of the present invention, as a screen including a play region of a content is scrolled, even if a portion of the play region disappears from the screen, video data displayed on the play region is transmitted to at least one external device, which is capable of displaying the video data displayed on the play region, by real time. Therefore, a user is able to keep watching the content via the at least one external device despite that the play region of the content disappears from the screen.

First of all, a configuration of an external device 700, which displays video data received from the mobile terminal 100 after connecting communication with the mobile terminal, is described in detail with reference to FIG. 3.

Figure 3:
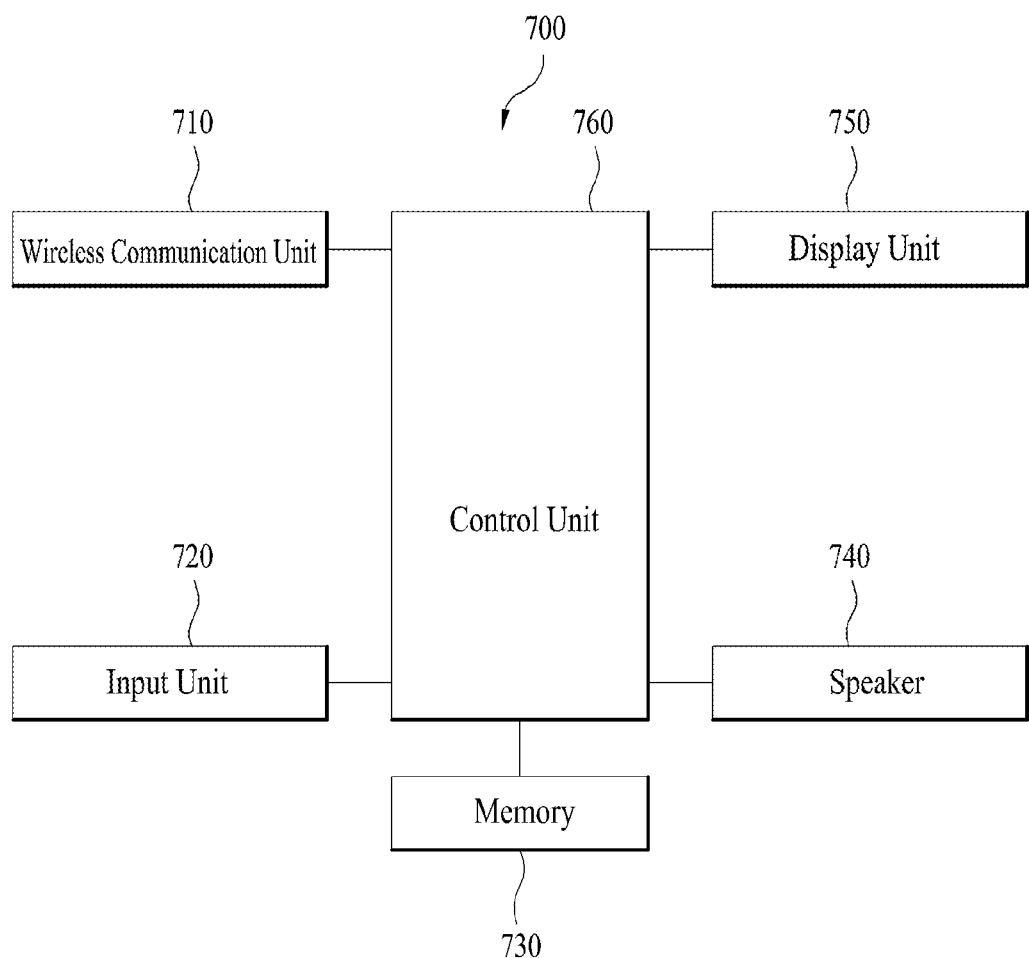
FIG. 3 is a block diagram of an external device according to one embodiment of the present invention.

FIG. 3 is a block diagram of an external device according to one embodiment of the present invention.

Referring to FIG. 3, an external device 700 according to the present invention may include a wireless communication unit 710, an input unit 720, a memory 730, a speaker 740, a display unit 750 and a control unit 760.

Of course, the external device 700 may further include the former components (e.g., camera, interface unit, etc.) mentioned in the foregoing description of the mobile terminal 100 in addition to the above-mentioned components.

The wireless communication unit 710 connects communication with the mobile terminal 100 according to the present invention and is then able to receive video data of a screen displayed on the mobile terminal 100, corresponding audio data and key input data from the mobile terminal 100.

Like the former wireless communication unit 110 of the mobile terminal 100 shown in FIG. 1, the above-configured wireless communication unit 710 may include such a communication module capable of enabling the communication between the mobile terminal 100 and the external device 700 as a mobile communication module, a wireless internet module, a short-range communication module and the like.

For instance, the communication between the mobile terminal 100 and the external device 700 may be connected by one of communication technologies including mobile communication, wireless internet communication, Bluetooth, DLNA and the like.

The input unit 720 may generate a key signal for controlling an operation of the external device 700. In some case, the input unit 720 may include at least one of a keypad, a dome switch, a touchpad (pressure-static/electrostatic), a jog wheel, a jog switch, a mouse and the like.

The memory 730 may store a program for the operation of the external device 700. And, various data including a video file, an audio file, an image file and the like can be saved in the memory 730.

The speaker 740 outputs the audio file saved in the memory 730 and sounds generated from various digital frames 200. And, the speaker 740 outputs audio data related to video data received from the mobile terminal 100.

The display unit 750 displays information processed by the external device 700. The above-configured display unit 750 may include at least one of a liquid crystal display (LCD), a thin film transistor liquid crystal display (TFT LCD), an organic light-emitting diode (OLED), a flexible display, a 3D display and the like. Moreover, the display unit may be configured into a touchscreen by being combined with a touch sensor.

The display unit 750 displays video data received from the mobile terminal 100. If a signal indicating a display scheme of the video data is received from the mobile terminal 100 together with the video data, the display unit 750 displays the video data on a screen by the system corresponding to the received signal under the control of the control unit 760.

The control unit 760 controls overall operations of the external device 700. According to the present invention, the control unit 760 controls the video data, which is received from the mobile terminal 100, to be displayed on the screen of the display unit 750. In doing so, if the signal indicating the display scheme of the video data is received via the wireless communication unit 710 from the mobile terminal 100 together with the video data, the control unit 760 controls the video data to be displayed on the screen of the display unit 750 by the display scheme corresponding to the signal.

In the above description, the configuration of the external device 700 according to the present invention is explained.

In the following description, a process for sharing video data between the above-configured mobile terminal 100 and the above-configured external device 700 is explained with reference to FIG. 4.

FIG. 4 is a diagram to describe a system including a mobile terminal according to the present invention and at least one external device.

First of all, FIG. 4 (*a*) shows a system including a mobile terminal 100 and at least one external device 700.

Referring to FIG. 4 (*a*), the mobile terminal 100 is able to transmit video data, which is displayed on a screen of the mobile terminal 100, to the external device 700.

In doing so, the mobile terminal 100 may be connected to the external device 700 by wire/wireless communication. For instance, the mobile terminal 100 and the external device 700 may be able to communicate with each other via a wired data cable.

Moreover, the mobile terminal 100 and the external device 700 may be connected to each other by such a wireless communication as a mobile communication, a wireless internet communication, a short range communication and the like. In case of using the short range communication, the mobile terminal 100 and the external device 700 may be connected to each other by such a short range communication scheme as Bluetooth, DLNA and the like.

In particular, a user of the mobile terminal 100 selects the external device 700 from a list of recently Bluetooth-connected devices and is then able to establish a communication with the selected external device 700. In particular, the user of the mobile terminal 100 selects the external device 700 from the DLNA registered devices within a current home and is then able to establish a communication with the selected external device 700.

According to the present invention, the screen of the mobile terminal 100 includes a content play region on which the video data of the played content is displayed. As the screen is scrolled, if a portion of the play region disappears from the screen, the played video data of the content displayed on the play region is transmitted to the external device 700 by real time.

In doing so, the external device 700 controls the video data 10, which is received from the mobile terminal 100, to be displayed in the same size of the screen actually displayed on the mobile terminal 100. Alternatively, the external device 700 may control the video data 10 to be displayed on a full screen of the external device 700 by being enlarged.

In particular, even if the portion of the play region of the content disappears from the screen by the scroll, the mobile terminal 100 transmits the played video data of the content to the external device 700 by real time. Therefore, the user of the mobile terminal 100 is able to keep watching the content via the external device 700.

Referring to FIG. 4 (b), at least two or more external devices 700-1 to 700-n are located nearby the mobile terminal 100 and can be connected to the mobile terminal 100 by wire/wireless communications.

For instance, a communication can be established between the mobile terminal 100 and each of the external devices 700-1 to 700-n via a wire data cable. For another instance, the mobile terminal 100 and each of the external devices 700-1 to 700-n can be connected to each other by such a wireless communication as a mobile communication, a wireless internet communication, a short range communication and the like.

In case of using the short range communication, the mobile terminal 100 and each of the external devices 700-1 to 700-n may be connected to each other by such a short range communication scheme as Bluetooth, DLNA and the like.

In particular, a user of the mobile terminal 100 selects each of the external devices 700-1 to 700-n from a list of recently Bluetooth-connected devices and is then able to establish a communication with the selected external device. In particular, the user of the mobile terminal 100 selects each of the external devices 700-1 to 700-n from the DLNA registered devices within a current home and is then able to establish a communication with the selected external device.

According to the present invention, the screen of the mobile terminal 100 includes a content play region on which the video data of the played content is displayed. As the screen is scrolled, if a portion of the play region disappears from the screen, the played video data of the content displayed on the play region is transmitted to each of the external devices 700-1 to 700-n by real time.

In doing so, each of the external devices 700-1 to 700-n controls the video data 10, which is received from the mobile terminal 100, to be displayed in the same size of the screen actually displayed on the mobile terminal 100. Alternatively, each of the external devices 700-1 to 700-n may control the video data 10 to be displayed on a full screen of the external device 700 by being enlarged.

In the following description, an operating process for a mobile terminal to transmit play video data displayed on a content play region within a screen of the mobile terminal to at least one external device is explained in detail with reference to FIGS. 5 to 30.

Figure 5:
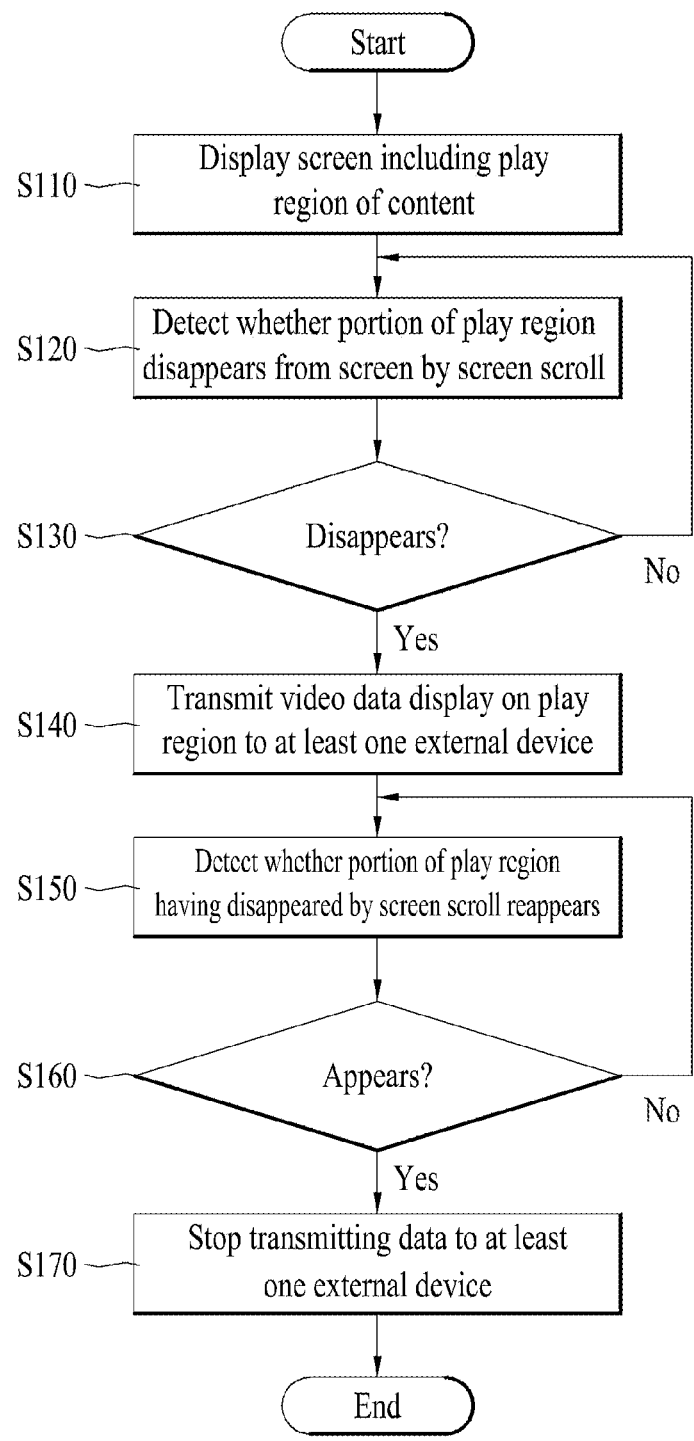
FIG. 5 is a flowchart for an operating process of a mobile terminal according to the present invention.

FIG. 5 is a flowchart for an operating process of a mobile terminal according to the present invention.

Referring to FIG. 5, if a screen including a play region of at least one content is displayed on the touchscreen 151 [S110], the controller 180 of the mobile terminal 100 detects whether a portion of the play region disappears by a scroll of the screen [S120].

In doing so, the content is being played back and video data of the currently played content is displayed on the play region of the content.

If a user drags the screen in top or bottom direction in a manner of touching a prescribed part of the screen, the controller 180 recognizes the drag touch action of the user as an action for the scroll of the screen and is then able to scroll the screen in the top or bottom direction in accordance with a dragged distance in the top or bottom direction.

If the controller 180 detects that the portion of play region disappears by the top- or bottom-directional scroll action of the user [S130], the controller 180 transmits the video data displayed on the play region of the content to at least one external device [S140].

In particular, as the screen is scrolled in the top direction, if a portion of a top end part of the play region or the whole play region disappears from the screen, the controller 180 transmits the video data by real time in order for the at least one external device to display the video data displayed on the play region of the content. For instance, if at least 50% of a size of the play region disappears from the screen due to the scroll of the screen, the controller 180 transmits the video data displayed on the play region to the at least one external device.

In doing so, as a condition for transmitting the video data to the at least one external device, a disappearing rate of the play region may be set up by a user.

In particular, the controller 180 provides a menu of the mobile terminal 100 with a setting menu for setting the disappearing rate of the play region and the user is then able to set up a desired disappearing rate of the play region via the setting menu.

For instance, while the user sets the disappearing rate to 70% via the setting menu, if 70% of the size of the play region disappears from the screen by the scroll of the screen, the controller 180 is able to transmit the video data displayed on the play region to the at least one external device.

As mentioned in the above description, while the controller 180 is transmitting the video data displayed on the play region of the content to the at least one external device, the controller 180 detects whether the portion of the play region having disappeared due to the screen scrolled by the user in the step S130 appears again [S150].

If the portion of the play region having disappeared due to the screen scrolled by the user in the step S130 appears again [S160], the controller 180 controls the wireless communication unit 110 to stop transmitting the video data which is being transmitted to the at least one external device by real time [S170].

In particular, as the screen is scrolled in the top direction, the portion of the top end part of the play region or the whole play region disappears from the screen. So, while the video data displayed on the play region is being transmitted to the at least one external device, if the screen is scrolled in the bottom direction to enable the portion of the top end part of the play region or the whole play region to reappear on the screen, the user is able to normally watch the whole image of the content again via the play region. Therefore, the controller 180 stops the transmission of the video data which is being transmitted to the at least one external device by real time.

In this case, if the transmission of the video data is stopped, the controller 180 may disconnect the communication with the at least one external device.

For instance, if the play region, of which 50% has disappeared by the screen scroll, appears again, the controller 180 is able to stop the transmission of the video data which is being transmitted by real time.

In this case, as a condition for stopping the real-time transmission of the video data, the appearing rate of the play region can be set up by the user.

In particular, the controller 180 provides a menu of the mobile terminal 100 with a setting menu for setting the appearing rate of the play region and the user is then able to set up a desired appearing rate of the play region via the setting menu.

For instance, while the user sets the appearing rate to 70% via the setting menu, if 70% of the size of the play region appears on the screen by the scroll of the screen, the controller 180 is able to stop the transmission of the video data which is being transmitted by real time.

In the following description, an operating process of a mobile terminal configured to transmit play video data displayed on a play region of content within a screen to at least one external device is explained in detail with reference to FIGS. 6 to 30.

In the following description with reference to FIGS. 6 to 24, assume that the content includes a video and that the screen includes a webpage including a play region of the video. Of course, a type of the content and a type of the screen may be non-limited by the video and the webpage, respectively.

For instance, the content may include such a playable multimedia as a broadcast, a video, a music, an animation and the like. And, the screen including the play region of the content may include one of a broadcast play screen including the play region of the broadcast, a video play screen including the play region of the video, a music play screen including the play region of the music, an animation play screen including the play region of the animation and the like.

Moreover, each of the screens may further include a text, an image and the like in addition to the play region of the corresponding content. And, each of the screens includes a scrollable screen because it is impossible to display whole information on a full screen.

The content may include such data executable or displayable in the mobile terminal 100 as an image, a message, an email, a document, a map, a memo and the like.

In this case, the content includes the data that is not playable but displayable, the terminology of 'play region; of the content may be substituted with 'display region'.

In particular, if the content includes a memo, a screen including a display region of the memo may include a memo menu (or application) screen. Moreover, if the content includes a map, a screen including a display region of the map may include a map application screen.

In the following description, a timing point of connecting a communication between a mobile terminal and at least one external device is explained in detail with reference to FIG. 6 and FIG. 7.

Figure 6:
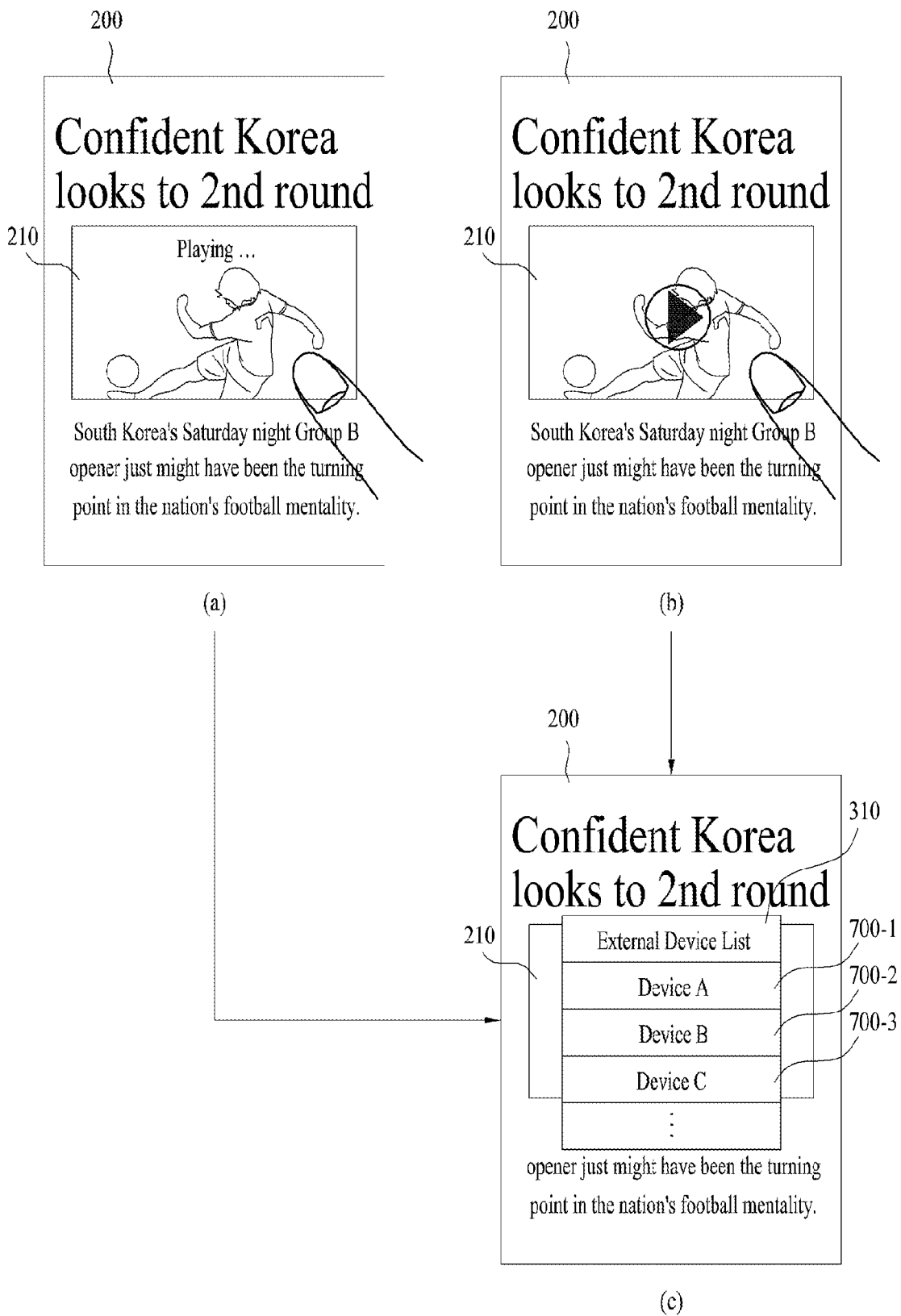
Figure 7:
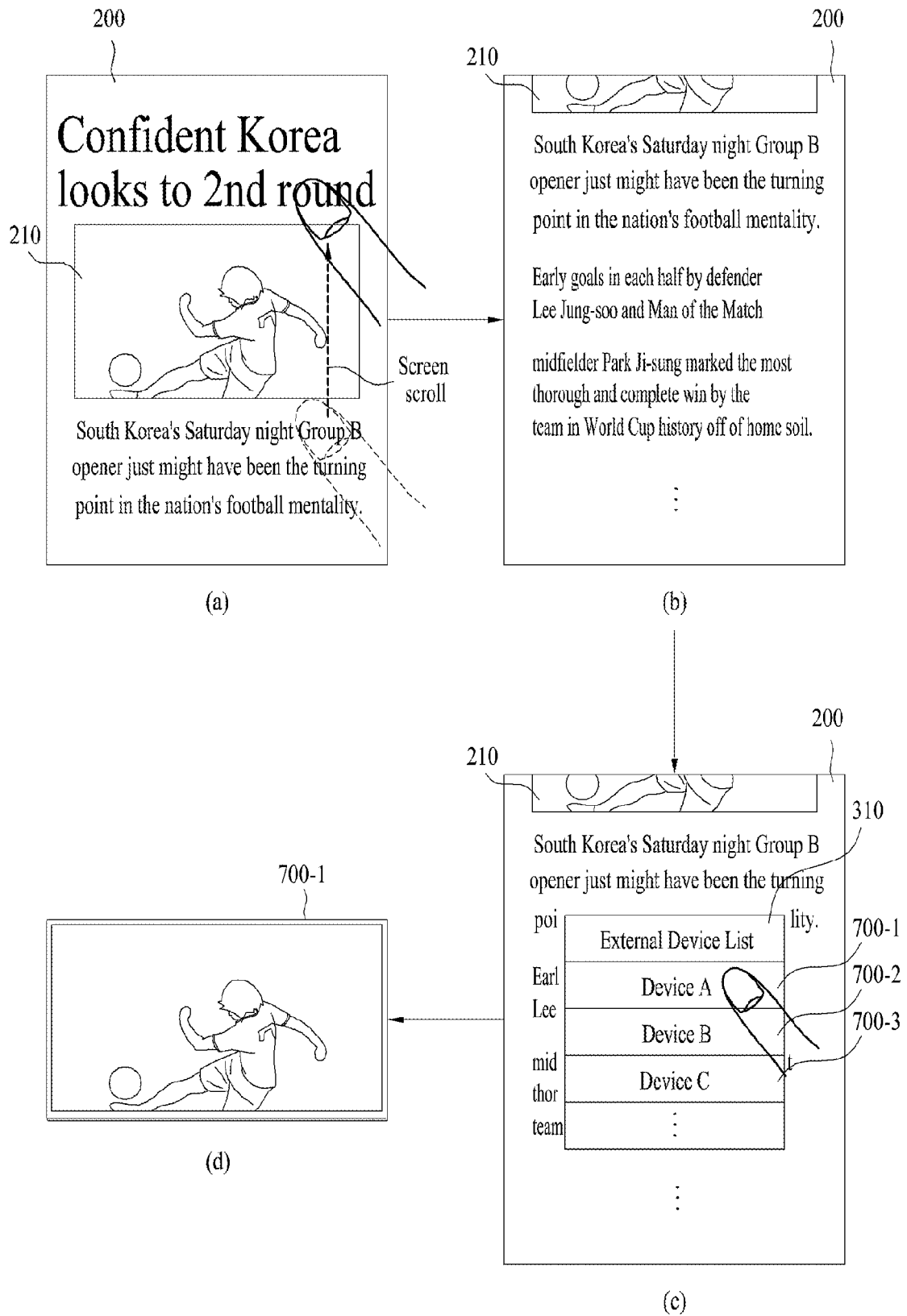

FIG. 6 and FIG. 7 shows on example that a webpage screen 200 including a text related to news and a video play region 210 related to the news is displayed on the touchscreen 151.

FIG. 6 (*a*) shows that video data of a currently played video is displayed within the video play region 210 while the video is being played. FIG. 6 (*b*) shows that a video is not currently played despite that the video play region 210 is included in the webpage screen 200.

If the video play region 210 shown in FIG. 6 (*a*) or FIG. 6 (*b*) is selected, the controller 180 searches an area around the mobile terminal 100 for at least one or more external devices 700-1, 700-2 and 700-3, which are communication connectable, via the wireless communication unit 110. Referring to FIG. 6 (*c*), the controller 180 controls a list 310 including the found at least one or more external devices 700-1, 700-2 and 700-3 to be displayed on the webpage screen 200.

IN this case, the at least one or more external devices 700-1, 700-2 and 700-3 included in the list 310 may include external devices previously connected by short range communications via the short range communication module 114.

For instance, if the play region 210 of the video is selected, the controller 180 may display the list 310 including the at least one or more external devices 700-1, 700-2 and 700-3 previously Bluetooth connected via the wireless communication unit 110. For another instance, if the play region 210 of the video is selected, the controller 180 may display the list 310 including the at least one or more external devices 700-1, 700-2 and 700-3 registered with DLNA network at home of a current user via the wireless communication unit 110.

Meanwhile, it may be able to use a long touch as a paging command for the list 310 on the webpage screen 200. In particular, if the play region 210 of the video is simply short touched in general, the video is played or pauses. For this, according to the present invention, if the play region 210 of the video is long touched, the list 310 can be configured and displayed. The long touch means a touch maintained during preset duration while the play region 210 of the video is touched.

If at least one external device is selected from the list 310 shown in FIG. 6 (*c*) for example, the controller 180 connects communication with the selected at least one external device. Thereafter, if the video is played, the controller 180 is able to transmit video data displayed on the play region 210 of the video to the selected at least one external device by real time.

Meanwhile, the controller 180 may be in a state that a communication with at least one external device is connected in advance in accordance with a user setting before the webpage screen 200 is displayed. Moreover, after the webpage screen 200 has been displayed, the controller 180 is able to connect a communication with at least one external device by user's menu manipulation or the like irrespective of selecting the play region 210 of the video like FIG. 6.

FIG. 7 (*a*) shows that video data of a video, which is being played, is displayed on a video play region 210 within a webpage screen 200.

In doing so, as the webpage screen 200 is scrolled, referring to FIG. 7 (*b*), if a portion of the play region 210 of the video disappears from the webpage screen 200, the controller 180 searches an area around the mobile terminal 100 for at least one or more communication-connectable external devices 700-1, 700-2 and 700-3 via the wireless communication unit 110 by the same process shown in FIG. 6. Subsequently, referring to FIG. 7 (*c*), the controller 180 controls a list 310 including the found at least one or more external devices 700-1, 700-2 and 700-3 to be displayed on the webpage screen 200.

For instance, referring to FIG. 7, if a user scrolls the webpage screen 200 in top direction by inputting a top-directional drag touch to the webpage screen 200, a portion of a top end part of the video disappears from the webpage screen 200.

Of course, if a user scrolls the webpage screen 200 in bottom direction by inputting a bottom-directional drag touch to the webpage screen 200, a portion of a bottom end part of the video may disappear from the webpage screen 200 [not shown in the drawing].

If a specific external device 700-1 is selected from the list 310 shown in FIG. 7 (c) for example, the controller 180 connects a communication with the selected external device 700-1 via the wireless communication unit 110 and then transmits the video data displayed on the video display region 210 to the selected external device 700-1 by real time.

FIG. 7 (d) shows that the video data transmitted by the mobile terminal 100 by real time is displayed on a screen of the selected external device 700-1 by real time.

Of course, if at least two or more external devices 700-1 and 700-2 are selected from the list 310, the controller 180 may be able to transmit the video data displayed on the video play region 210 to each of the selected at least two external devices 700-1 and 700-2 by real time.

Figure 9:
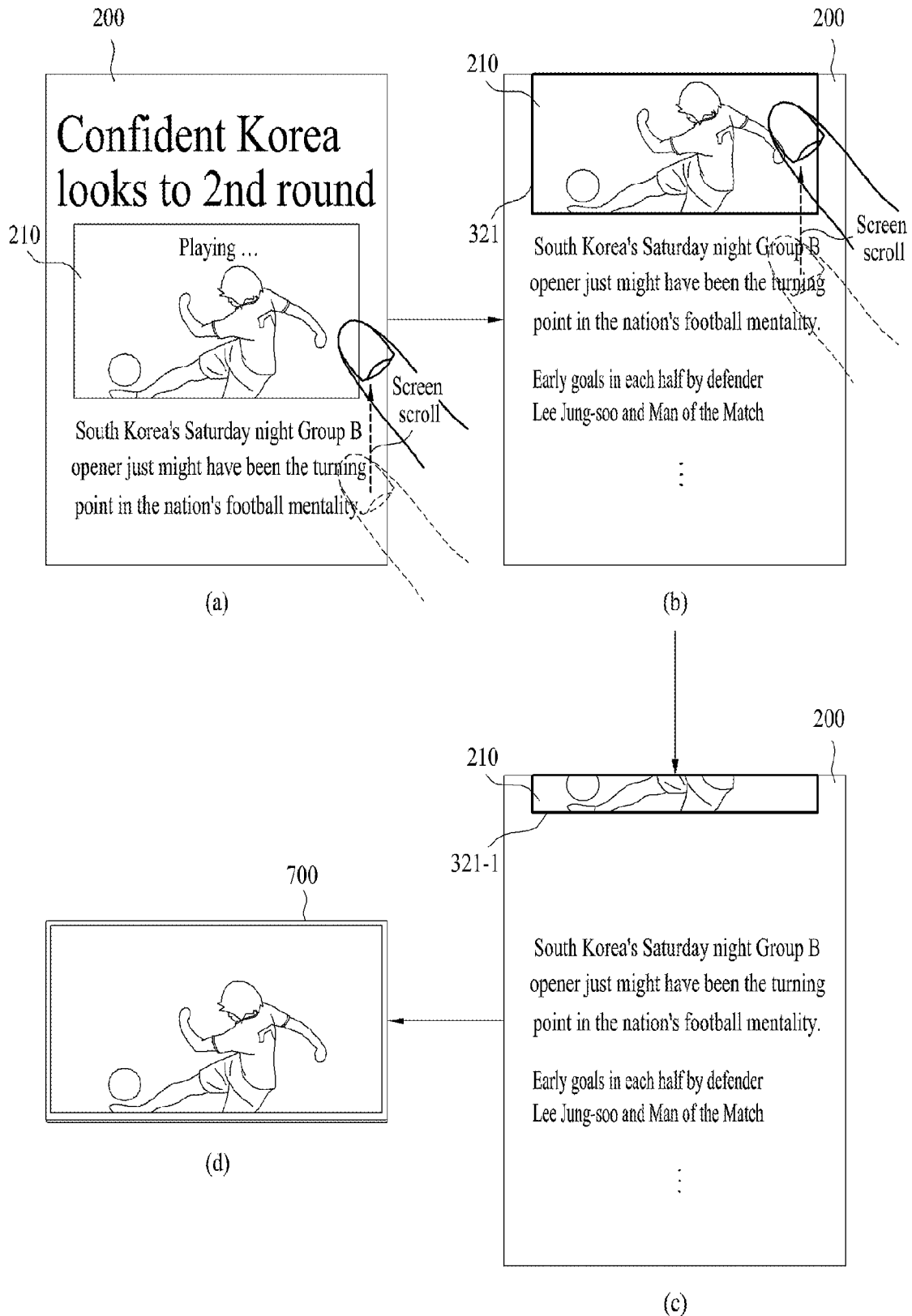

FIG. 8 and FIG. 9 show a process for displaying information indicating that video data displayed on a play region 210 of a video currently played on a webpage screen 200 can be transmitted to at least one external device if a mobile terminal is connected to the at least one external device by communication.

In particular, while the information is displayed on the webpage screen 200, if the webpage screen 200 is scrolled, a portion of the play region 210 of the video disappears from the webpage screen 200. If so, a user is able to recognizes a situation, in which the video data displayed on the play region 210 of the video is transmitted to the at least one external device, in advance.

First of all, referring to FIG. 8 (a), as a video is played within a webpage screen 200, while video data of the video is displayed on a play region 210 of the video, a communication with at least one external device is connected via the wireless communication unit 110. Alternatively, while the communication with the at least one external device is connected, as the video is played thereafter, the video data of the video is displayed on the play region 210 of the video. If so, referring to FIG. 8 (b) and FIG. 8 (c), the controller 180 controls information, which indicates the video data can be transmitted to the communication-connected at least one external device, to be displayed on the webpage screen 200.

For instance, referring to FIG. 8 (b), the information may be displayed as a highlight 321 in specific color on an outline of the play region 210 of the video.

In particular, if the highlight 321 is displayed on the outline of the play region 210 of the video, the user is able to previously recognize that the video data displayed on the play region 210 of the video will be transmitted to the communication-connected at least one external device if a portion of the play region 210 of the video disappears by scrolling the webpage screen 200.

In doing so, if the highlighted play region 210 of the video is selected, the controller 180 skips the steps S120 and S130 shown in FIG. 5 and may be able to directly transmit the video data displayed on the play region 210 to the communication-connected at least one external device.

For another instance, referring to FIG. 8 (c), the information may be displayed as a text word balloon 322 indicating the information.

In this case, if the word balloon 322 is selected, the controller 180 skips the steps S120 and S130 shown in FIG. 5 and may be able to directly transmit the video data displayed on the play region 210 to the communication-connected at least one external device.

Meanwhile, as the webpage screen 200 is scrolled [FIG. 9 (a)], if a disappearing size of the play region 210 of the video becomes equal to or smaller than a preset size [FIG. 9 (b)], the controller 180 may control a highlight 321 in a $1^{st}$ color to be displayed on an outline of the play region 210 of the video. In this case, the highlight 321 in the $1^{st}$ color means the information indicating that the video data can be transmitted to the communication-connected at least one external device, as shown in FIG. 8 (b).

Subsequently, as the webpage screen 200 is further scrolled continuously [FIG. 9 (b)], if the disappearing size of the play region 210 of the video becomes equal to or greater than the preset size, the controller 180 displays a highlight 321-1 in $2^{nd}$ color on the outline of the play region 210 [FIG. 9 (c)] and transmits the video data displayed on the play region 210 to the at least one external device 700 by real time.

In doing so, the highlight 321-1 in the $2^{nd}$ color means the information indicating that the video data is being transmitted to the at least one external device by real time. Hence, the user sees the highlight 321-1 in the $2^{nd}$ color displayed on the outline of the play region 210, thereby recognizing that the video data is being transmitted to the at least one external device by real time.

In particular, if the highlight 321 in the $1^{st}$ color is displayed on the outline of the video play region 210, the user is able to realize that the video data is not currently transmitted to the at least one external device and that the video data can be transmitted to the at least one external device if the webpage screen 20 is further scrolled. If the highlight 321-1 in the $2^{nd}$ color is displayed on the outline of the video play region 210, the user is able to realize that the video data is currently transmitted to and displayed on the at least one external device by real time.

In this case, the preset size means the size substantially disappearing from the webpage screen 200 by the scroll performed on the play region 210 of the video when the video data is transmitted to the at least one external device. And, the preset size can be set up by the user.

In particular, the controller 180 provides the menu of the mobile terminal 100 with a setting menu for setting a disappearing rate of the play region 210. And, the user is able to set up a desired disappearing rate of the play region via the setting menu.

For example, after the user has set the disappearing rate to 70% via the setting menu, if a disappearing size of the play region 210 becomes equal to or smaller than 70% of the original size of the play region 210 by the scroll, the controller 180 displays the highlight 321 in the $1^{st}$ color. As the webpage screen 200 is further scrolled, if the disappearing size of the play region 210 becomes equal to or greater than 70%, the controller displays the highlight 321-1 in the $2^{nd}$ color and transmits the video data displayed on the play region 210 to the at least one external device by real time.

FIG. 10 shows a following process. First of all, as a webpage screen 200 is scrolled, if a portion of a play region 210 disappears from the webpage screen 200, video data displayed on the play region 210 is not directly transmitted to at least one communication-connected external device. Instead, a user is provided with a setting window for setting whether to transmit the video data, thereby enabling the video data to be selectively transmitted to the at least one external device.

Referring to FIG. 10, as the webpage screen 200 is scrolled by a user's touch action [FIG. 10 (a)], if a portion of the play region 210 of the video included in the webpage screen 200 disappears, the controller 180 controls the setting window 330 to be displayed on the webpage screen 200 [FIG. 10 (b)]. In this case, the setting window 330 is provided to set up whether to transmit the video data displayed on the play region 210.

For instance, the setting window 330 may include a $1^{st}$ setting menu 331 for an enabling setting of a transmission of the video data and a $2^{nd}$ setting menu 332 for a disabling setting of the video data.

In particular, if the $1^{st}$ setting menu 331 is selected, the controller 180 transmits the video data displayed on the play region 210 of the video to the at least one external device by real time so that the at least one external device can display the video data by real time.

If the $2^{nd}$ setting menu 332 is selected, the controller 180 controls the video data not to be transmitted to the at least one external device despite that the transmission condition of the video data displayed on the play region 210 is met because a portion of the play region 210 of the video disappears from the webpage screen 200.

Figure 11:
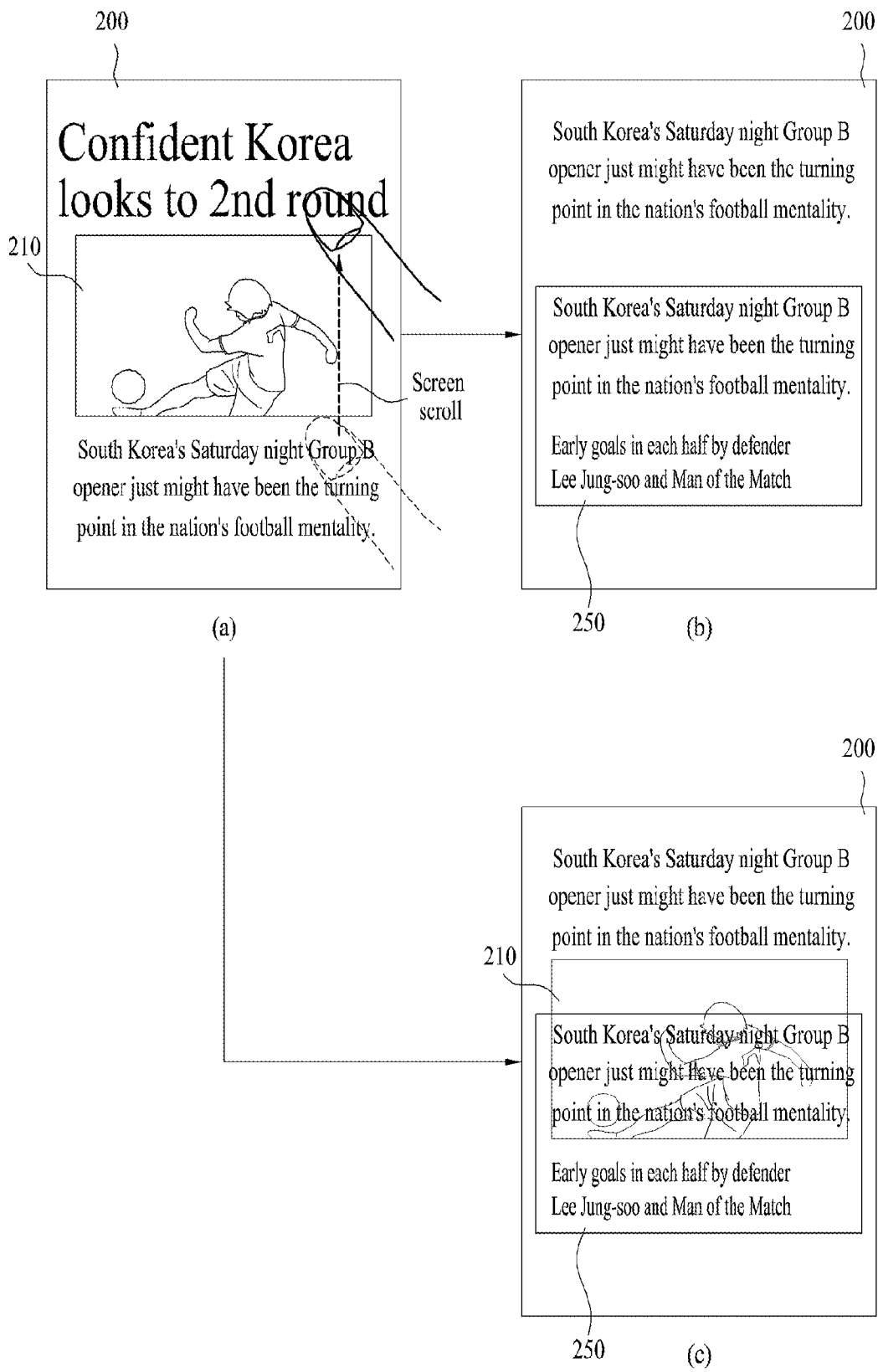

FIG. 11 shows a following process. First of all, as a webpage screen 200 is scrolled, a portion of a play region 210 disappears from the webpage screen 200. So, if video data displayed on the play region 210 is transmitted to at least one external device, which is communication connected, by real time, the play region 210 of the video is made to disappear from the webpage screen 200. Therefore, a display available space in the webpage screen 200 is increased to display more additional information on the webpage screen 200.

Referring to FIG. 11 (a), as a webpage screen 200 is scrolled by a user's touch action, if a portion of a play region 210 of a video included in the webpage screen 200 disappears, the controller 180 transmits video data displayed on the play region 210 to at least one communication-connected external device by real time.

Referring to FIG. 11 (b), if the video data is being transmitted to the at least one external device, the controller 180 does not further display the play region 210 of the video on the webpage screen 200 but controls an additional information 250 to be displayed on a space, from which the play region 210 of the video has disappeared, to be displayed within the webpage screen 200.

In particular, the additional information 250, which is not currently displayed on the webpage screen 200 due to a screen size of the touchscreen 151 despite being provided by the webpage, may mean the information displayable by a scroll performed on the webpage screen 200 by a user.

For instance, referring to FIG. 11 (b), the play region 210 of the video disappears from the webpage screen 200 and an additional text information on news is displayed on the space from which the play region 210 of the video has disappeared.

In particular, referring to FIG. 11 (b), the user watches the video within the previous webpage screen 200 via the at least one external device and is also able to watch more information via the current webpage screen 200.

Referring to FIG. 11 (c), if the video data is being transmitted to the at least one external device, the controller 180 controls the play region 210 of the video to be displayed transparently within the webpage screen 200 and is also able to control the additional information 250 to be displayed in the space in which the play region 210 of the video is displayed transparently within the webpage screen 200.

In this case, transparency of the play region 210 of the video may include the transparency that enables the additional information 250 to be identifiable through user's eyes.

In particular, referring to FIG. 11 (c), the user is able to simultaneously watch both of the video and the additional information 250 within the webpage screen 200 while watching the video via the at least one external device.

Figure 12:
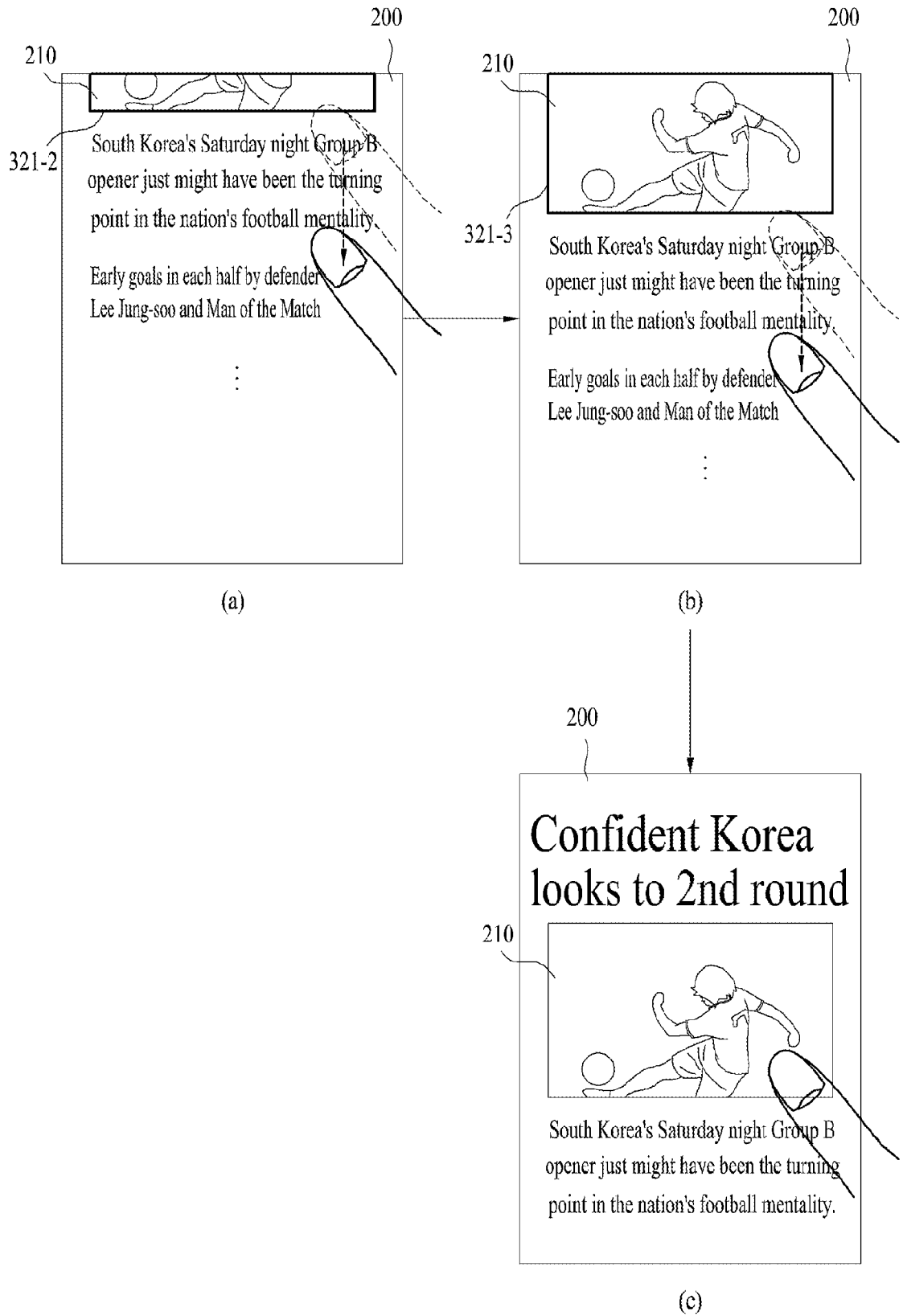

FIG. 12 shows a following process. First of all, as a portion of a play region 210 of a video or the whole play region 210 disappears from a webpage screen 200, while video data displayed on the play region 210 is being transmitted to at least one communication-connected external device by real time, if the webpage screen 200 is scrolled again, a portion of the play region 210 having disappeared from the webpage screen 200 reappears in the webpage screen 200, the wireless communication unit 110 is controlled to stop the real-time transmission of the video data.

Referring to FIG. 12 (a), as a webpage screen 200 is scrolled, if a portion of a previously disappearing portion of a play region 210 appears in a manner of amounting to a size equal to or smaller than a preset size, the controller 180 displays a $1^{st}$ information indicating that a transmission of video data, which is currently transmitted by real time, can be stopped.

For instance, the $1^{st}$ information may be displayed on an outline of the play region 210 in a manner of being represented as a highlight 321-2 having a $1^{st}$ color. In particular, a user sees the highlight 321-2 in the $1^{st}$ color, thereby recognizing that the video data is currently being transmitted to at least one external device and that the transmission of the video data can be stopped in case of further scrolling the webpage screen 200.

Referring to FIG. 12 (b), if the webpage screen 200 is further scrolled to enable the portion of the play region 210 to appear in a manner of amounting to a size equal to or greater than the preset size, the controller 180 stops the transmission of the currently real-time transmitted video data and displays a $2^{nd}$ information indicating that the transmission of the video data is stopped.

For instance, the $2^{nd}$ information may be displayed on an outline of the play region 210 in a manner of being represented as a highlight 321-3 having a $2^{nd}$ color. In particular, the user sees the highlight 321-3 in the $2^{nd}$ color, thereby recognizing that the transmission of the video data is currently stopped.

Referring to FIG. 12 (c), if the webpage screen 200 is further scrolled to enable the whole play region 210 to appear, the controller 180 may disconnect the communication with the at least one external device by controlling the wireless communication unit 110.

FIG. 13 shows a following process. First of all, as a webpage screen 200 is scrolled, if a previously disappearing portion of a play region 210 appears again, a user is provided with a setting window for setting up whether to stop a transmission of video data instead of stopping a transmission of the video data. Therefore, the user is able to selectively stop the transmission of the video data.

Referring to FIG. 13, as a webpage screen 200 is scrolled by a user's touch action [FIG. 13 (a)], if a portion of a previously disappearing play region 210 appears, the controller 180 controls a setting window 340, which is provided to set up whether stop a transmission of video data, to be displayed on the webpage screen 200 [FIG. 13 (b)].

For instance, the setting window 340 may include a $1^{st}$ setting menu 341 for enabling the transmission of the video data to be stopped and a $2^{nd}$ setting menu 342 for enabling the transmission of the video data to be maintained.

In particular, if the 1$^{st}$ setting menu 341 is selected, the controller 180 controls the wireless communication unit 110 to stop the transmission of the video data which is being transmitted to at least one external device by real time.

If the 2$^{nd}$ setting menu 32 is selected, the controller 180 controls the real-time transmission of the video data to be maintained.

Referring to FIG. 14, while the video data is being transmitted to the at least one external device by real time by the process described with reference to FIG. 11, when the video play region 210 has disappeared from the webpage screen 200, if the webpage screen 200 is scrolled to an original position of the disappearing video play region 210 [FIG. 14 (a)]. The controller 180 displays the video play region 210 again and may stop the transmission of the video data.

FIGS. 15 to 17 show a following process. First of all, as a portion of a 1$^{st}$ play region 210 of a 1$^{st}$ video has disappeared from a webpage screen 200, a 1$^{st}$ video data of the 1$^{st}$ play region 210 is transmitted by real time. Secondly, while the 1$^{st}$ video data is being transmitted, if the webpage screen 200 is scrolled again, a 2$^{nd}$ play region 220 of a 2$^{nd}$ video newly appears in the webpage screen 200. Thirdly, as the webpage screen 200 is scrolled again, if a portion of the 2$^{nd}$ play region 220 disappears from the webpage screen 200, a 2$^{nd}$ video data displayed on the 2$^{nd}$ play region is transmitted to at least one external device by real time. Finally, both of the 1$^{st}$ video data and the 2$^{nd}$ video data are displayed on a screen of the at least one external device.

Referring to FIG. 15, as a portion of a 1$^{st}$ play region 210 of a 1$^{st}$ video has disappeared from a webpage screen 200, a 1$^{st}$ video data of the 1$^{st}$ play region 210 is transmitted by real time [FIG. 15 (a)]. While the 1$^{st}$ video data is being transmitted to at least one external device, if the webpage screen 200 is scrolled again, a 2$^{nd}$ play region 220 of a 2$^{nd}$ video newly appears in the webpage screen 200 [FIG. 15 (b)]. If the 2$^{nd}$ play region 220 of the 2$^{nd}$ video is selected, the controller 180 plays the 2$^{nd}$ video and displays a 2$^{nd}$ video data of the 2$^{nd}$ video played on the 2$^{nd}$ play region 220.

Thereafter, as the webpage screen 200 is scrolled again, if a portion of the 2$^{nd}$ play region 220 disappears from the webpage screen 200, the controller 180 transmits the 2$^{nd}$ video data displayed on the 2$^{nd}$ play region to the at least one external device by real time together with the 1$^{st}$ video data of the 1$^{st}$ play region 210.

In doing so, as mentioned in the foregoing description with reference to FIG. 9, as the webpage screen 200 is gradually scrolled, the controller 180 controls the highlight 321 of the 1$^{st}$ color or the highlight 321-1 of the 2$^{nd}$ color to be displayed on an outline of the 2$^{nd}$ play region 220 and is able to perform an operation of transmitting the 2$^{nd}$ video data.

As mentioned in the foregoing description with reference to FIG. 11, if the 2$^{nd}$ video data of the 2$^{nd}$ play region 220 is transmitted to the at least one external device by real time, the controller 180 controls the 2$^{nd}$ play region 220 to disappear from the webpage screen 220 or to be displayed transparently within the webpage screen 200. And, the controller 180 may control additional information within the webpage screen 200 to be displayed on the space, in which the 2$^{nd}$ play region 220 has become transparent, or the space from which the 2$^{nd}$ play region 220 has disappeared.

As mentioned in the foregoing description with reference to FIGS. 12 to 14, if a portion of the disappearing 2$^{nd}$ play region 220 reappears by a scroll of the webpage screen 200, the controller 180 may control the real-time transmission of the 2$^{nd}$ video data to be stopped. While the transmission of the 2$^{nd}$ video data is stopped, if the webpage screen 200 is further scrolled to make a portion of the 1$^{st}$ play region 200 reappear, the controller 180 may control the real-time transmission of the 1$^{st}$ video data to be stopped.

Meanwhile, referring to FIG. 16, the controller 180 may control the at least one external device to display the 1$^{st}$ and 2$^{nd}$ data transmitted by real time in various display ways.

In particular, referring to FIG. 16 (a), the controller 180 generates a signal for commanding the at least one external device 700 to partition the screen of the display unit 750 into a 1$^{st}$ region and a 2$^{nd}$ region and to display the real-time transmitted 1$^{st}$ and 2$^{nd}$ video data on the 1$^{st}$ and 2$^{nd}$ regions, respectively and is then able to transmit the generated signal to the at least one external device 700 together with the 1$^{st}$ and 2$^{nd}$ video data.

Referring to FIG. 16 (b), the controller 180 generates a signal for commanding the at least one external device 700 to display the real-time transmitted 1$^{st}$ video data 351 on the whole screen and to display the real-time transmitted 2$^{nd}$ video data 352 on a portion of the screen and is then able to transmit the generated signal together with the 1$^{st}$ and 2$^{nd}$ video data.

Referring to FIG. 16 (c), the controller 180 generates a signal for commanding the at least one external device 700 to display the real-time transmitted 2$^{nd}$ video data 352 on the whole screen and to display the real-time transmitted 1$^{st}$ video data 351 on a portion of the screen and is then able to transmit the generated signal together with the 1$^{st}$ and 2$^{nd}$ video data.

Meanwhile, referring to FIG. 17, while the 1$^{st}$ video data of the 1$^{st}$ play region 210 is being transmitted, if a webpage screen 200 is scrolled, the 2$^{nd}$ play region 220 of the 2$^{nd}$ video newly appears [FIG. 17 (a)]. If the webpage screen 200 is scrolled again, a portion of the 2$^{nd}$ play region 220 disappears. If so, the controller 180 controls a setting window 360, which is provided to set up whether to transmit the 2$^{nd}$ video data 352, to be displayed on the webpage screen 200 instead of directly transmitting the 2$^{nd}$ video data 352 displayed on the 2$^{nd}$ play region 220 to the at least one external device 700.

For instance, the setting window 360 may include a 1$^{st}$ setting menu 361 for enabling the transmission of the 1$^{st}$ and 2$^{nd}$ video data, a 2$^{nd}$ setting menu 362 for enabling the transmission of the 2$^{nd}$ video data only, and a 3$^{rd}$ setting menu 363 for disabling the transmission of the 2$^{nd}$ video data.

In particular, if the 1$^{st}$ setting menu 361 is selected, the controller 180 transmits the 2$^{nd}$ video data 352 to the at least one external device by real time in addition to the 1$^{st}$ video data 351 currently transmitted by real time, thereby enabling the at least one external device to display both of the 1$^{st}$ video data 351 and the 2$^{nd}$ video data 352 by real time.

If the 2$^{nd}$ setting menu 362 is selected, the controller stops the transmission of the 1$^{st}$ video data 351 currently transmitted by real time and transmits the 2$^{nd}$ video data 352 to the at least one external device only, thereby enabling the at least one external device to display the 2$^{nd}$ video data 352 only.

If the 3$^{rd}$ setting menu 353 is selected, the controller 180 maintains the transmission of the 1$^{st}$ video data 352 currently transmitted by real time but controls the 2$^{nd}$ video data 352 not to be transmitted to the at least one external device by real time.

Figure 18:
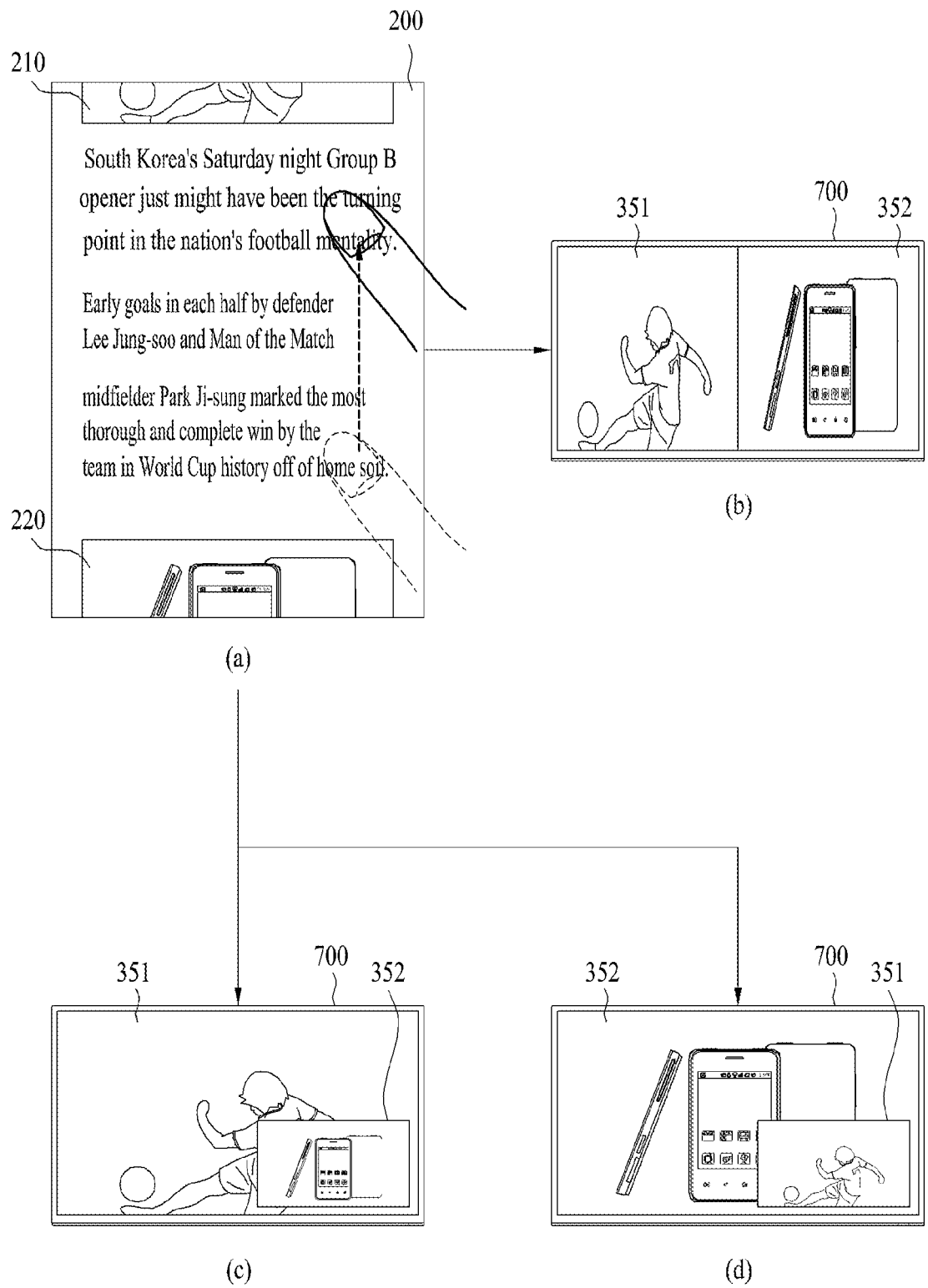

FIG. 18 and FIG. 19 show a following process. First of all, when at least two play regions (e.g., a 1$^{st}$ play region 210 of a 1$^{st}$ video and a 2$^{nd}$ play region 220 of a 2$^{nd}$ video, etc.) are included in a webpage screen 200, if the 1$^{st}$ play region 210 and the 2$^{nd}$ play region disappear in part by scrolling the webpage screen 200, a 1$^{st}$ video data 351 displayed on the 1$^{st}$ play region 210 and a 2$^{nd}$ video data 352 displayed on the 2$^{nd}$ play region 220 are transmitted to at least one external device.

Referring to FIG. 18 (a), while the webpage screen 200 including the 1$^{st}$ play region 210 and the 2$^{nd}$ play region 220 is displayed, as the webpage screen 200 is scrolled by a user, if a portion of the $1^{st}$ play region 210 and a portion of the $2^{nd}$ play region 220 disappear, the controller 180 may be able to transmit both of the $1^{st}$ video data 351 of the $1^{st}$ play region 210 and the $2^{nd}$ video data 352 of the $2^{nd}$ play region 220 to the at least one external device 700 by real time.

In doing so, as mentioned in the foregoing description with reference to FIG. 9, as the webpage screen 200 is gradually scrolled, the controller 180 controls the highlight 321 of the $1^{st}$ color or the highlight 321-1 of a $2^{nd}$ color to be displayed on an outline of each of the $1^{st}$ play region 210 and the $2^{nd}$ play region 220 and is able to perform an operation of transmitting the $2^{nd}$ video data.

As mentioned in the foregoing description with reference to FIG. 11, if the $1^{st}$ video data of the $1^{st}$ play region 210 and the $2^{nd}$ video data of the $2^{nd}$ play region 220 are transmitted to the at least one external device by real time, the controller 180 controls the $1^{st}$ play region 210 and the $2^{nd}$ play region 220 to disappear from the webpage screen 220 or to be displayed transparently within the webpage screen 200. And, the controller 180 may control additional information within the webpage screen 200 to be displayed on the space, in which each of the $1^{st}$ play region 210 and the $2^{nd}$ play region 220 has become transparent, or the space from which each of the $1^{st}$ play region 210 and the $2^{nd}$ play region 220 has disappeared.

As mentioned in the foregoing description with reference to FIGS. 12 to 14, if a portion of the disappearing $1^{st}$ or $2^{nd}$ play region 210 or 220 reappears by a scroll of the webpage screen 200, the controller 180 may control the real-time transmission of the $1^{st}$ or $2^{nd}$ video data to be stopped.

Meanwhile, the controller 180 may control the at least one external device to display the $1^{st}$ and $2^{nd}$ data transmitted by real time in various display ways.

In particular, referring to FIG. 18 (b), the controller 180 generates a signal for commanding the at least one external device 700 to partition the screen of the display unit 750 into a $1^{st}$ region and a $2^{nd}$ region and to display the real-time transmitted $1^{st}$ and $2^{nd}$ video data on the $1^{st}$ and $2^{nd}$ regions, respectively and is then able to transmit the generated signal to the at least one external device 700 together with the $1^{st}$ and $2^{nd}$ video data.

Referring to FIG. 18 (c), the controller 180 generates a signal for commanding the at least one external device 700 to display the real-time transmitted $1^{st}$ video data 351 on the whole screen and to display the real-time transmitted $2^{nd}$ video data 352 on a portion of the screen and is then able to transmit the generated signal together with the $1^{st}$ and $2^{nd}$ video data.

Referring to FIG. 18 (d), the controller 180 generates a signal for commanding the at least one external device 700 to display the real-time transmitted $2^{nd}$ video data 352 on the whole screen and to display the real-time transmitted $1^{st}$ video data 351 on a portion of the screen and is then able to transmit the generated signal together with the $1^{st}$ and $2^{nd}$ video data.

Meanwhile, referring to FIG. 19, as the webpage screen 200 is scrolled, if the $1^{st}$ play region 210 and the $2^{nd}$ play region 220 disappear in part [FIG. 19 (a)], the controller 180 controls a setting window 370, which is provided to set up whether to transmit the $1^{st}$ video data 351' and/or the $2^{nd}$ video data 352, to be displayed on the webpage screen 200 instead of directly transmitting the $1^{st}$ video data displayed on the $1^{st}$ play region 210 and the $2^{nd}$ video data 352 displayed on the $2^{nd}$ play region 220 to the at least one external device 700.

For instance, the setting window 360 may include a $1^{st}$ setting menu 371 for enabling the transmission of the $1^{st}$ and $2^{nd}$ video data, a $2^{nd}$ setting menu 372 for enabling the transmission of the $1^{st}$ video data only, a $3^{rd}$ setting menu 373 for enabling the transmission of the $2^{nd}$ video data only, and a $4^{th}$ setting menu 374 for disabling the transmission of the $1^{st}$ video data and the $2^{nd}$ video data.

In particular, if the $1^{st}$ setting menu 371 is selected, the controller 180 transmits both of the $1^{st}$ video data 351 and the $2^{nd}$ video data 352 to the at least one external device by real time, thereby enabling the at least one external device to display both of the $1^{st}$ video data 351 and the $2^{nd}$ video data 352 by real time.

If the $2^{nd}$ setting menu 372 is selected, the controller transmits the $1^{st}$ video data 351 to the at least one external device only, thereby enabling the at least one external device to display the $1^{st}$ video data 351 only by real time.

If the $3^{rd}$ setting menu 373 is selected, the controller transmits the $2^{nd}$ video data 351 to the at least one external device only, thereby enabling the at least one external device to display the $2^{nd}$ video data 352 only by real time.

If the $4^{th}$ setting menu 374 is selected, the controller 180 controls both of the $1^{st}$ video data 351 and the $2^{nd}$ video data 352 not to be transmitted to the at least one external device by real time.

FIGS. 20 to 24 show a following process. First of all, if a preset touch gesture is inputted to a video play region 210 within a webpage screen 200 irrespective of the former steps S120 and S130 shown in FIG. 5 or the preset touch gesture is inputted in addition to the former steps S120 and S130 shown in FIG. 5, video data displayed on the play region 210 is transmitted to at least one external device by real time.

Figure 20:
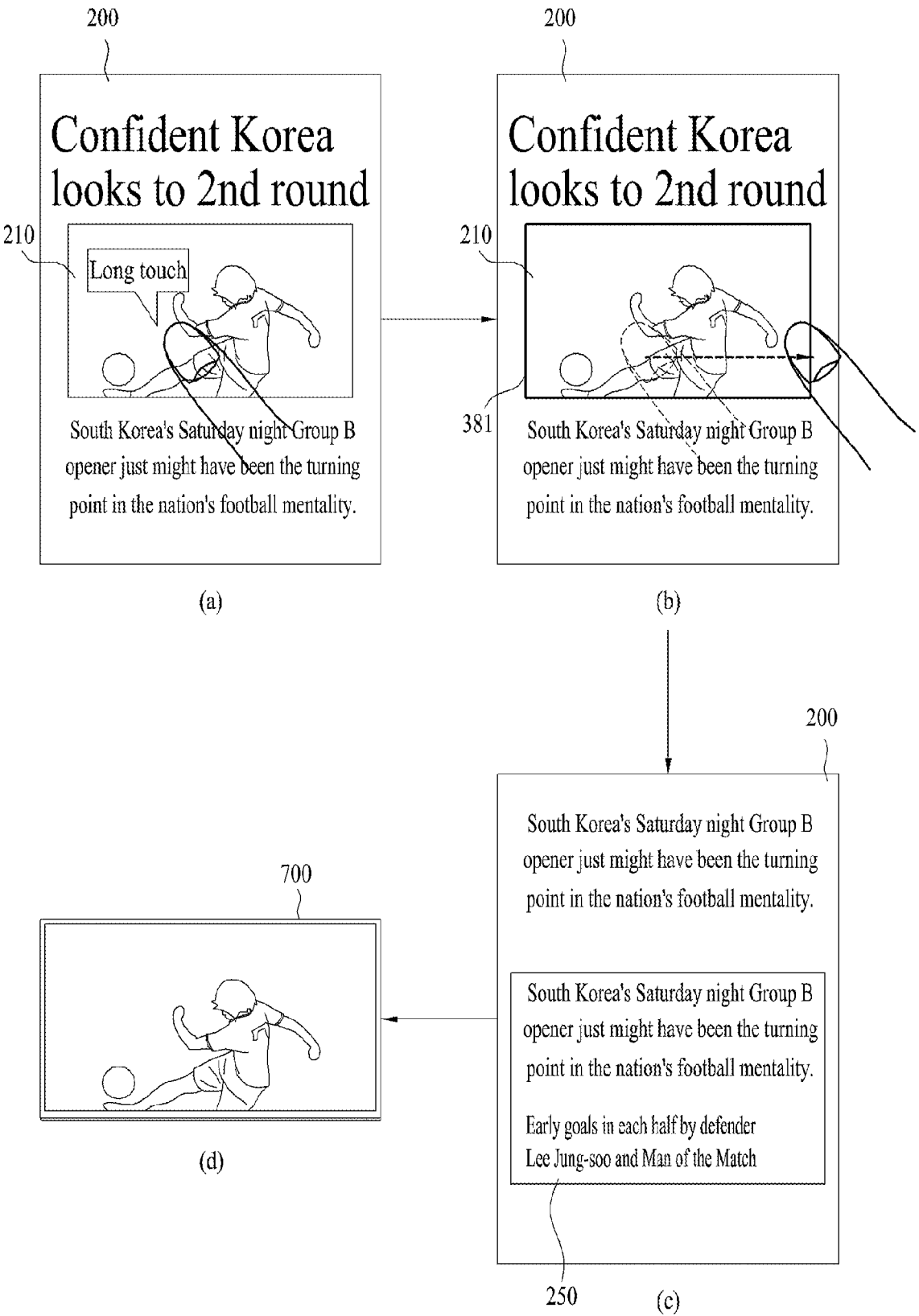

Referring to FIG. 20, while a video is played within a webpage screen 200, if a long touch is initially applied to a play region 210 of the video, video the controller 180 controls a highlight 321 having a $1^{st}$ color to be displayed on an outline of the play region 210 of the video as information indicating that data displayed on the play region 210 can be transmitted to the at least one external device 700 [FIG. 20 (a)].

Subsequently, if a drag touch is inputted to the video play region 210 in a manner of being dragged in a specific direction [FIG. 20 (b)], the controller 180 transmits the video data to the at least one external device [FIG. 20 (c), FIG. 20 (d)].

In particular, if the highlight 321 of the $1^{st}$ color is displayed on the outline of the video play region 210, a user is able to recognize that the video data can be transmitted to the at least one external device 700 in case of inputting the touch drag to the video play region 210, despite that the video data is not currently transmitted to the at least one external device 700.

Moreover, referring to FIG. 20 (c), as mentioned in the foregoing description with reference to FIG. 11, if the video data is being transmitted to the at least one external device 700, the controller 180 does not display the play region 210 of the video within the webpage screen 200 anymore but controls an additional information to be displayed in a space, from which the play region 210 of the video disappears, within the webpage screen 200.

In particular, the additional information, which is not currently displayed on the webpage screen 200 due to a screen size of the touchscreen 151 despite being provided by the webpage, may mean the information displayable by a scroll performed on the webpage screen 200 by a user.

For instance, referring to FIG. 20 (b), the play region 210 of the video disappears from the webpage screen 200 and additional text information on news is displayed on the space from which the play region 210 of the video has disappeared.

Moreover, if the video data is being transmitted to the at least one external device 700, the controller 180 controls the play region 210 of the video to be displayed transparently within the webpage screen 200 and is also able to control the additional information to be displayed in the space in which the play region 210 of the video is displayed transparently within the webpage screen 200.

Meanwhile, referring to FIG. 21, while the mobile terminal 100 is communication-connected to at least two or more external devices 700-1, 700-2 and 700-3 located nearby by the process described with reference to FIG. 6 and FIG. 7 and a highlight 381 is displayed on an outline of the play region 210 of the video, if a drag touch in a specific direction is inputted to the play region 210 of the video [FIG. 21 (a)], the controller 180 transmits video data displayed on the play region 210 to the external device 700-2 located in the drag direction of the drag touch among the external devices 700-1, 700-2 and 700-3.

Figure 22:
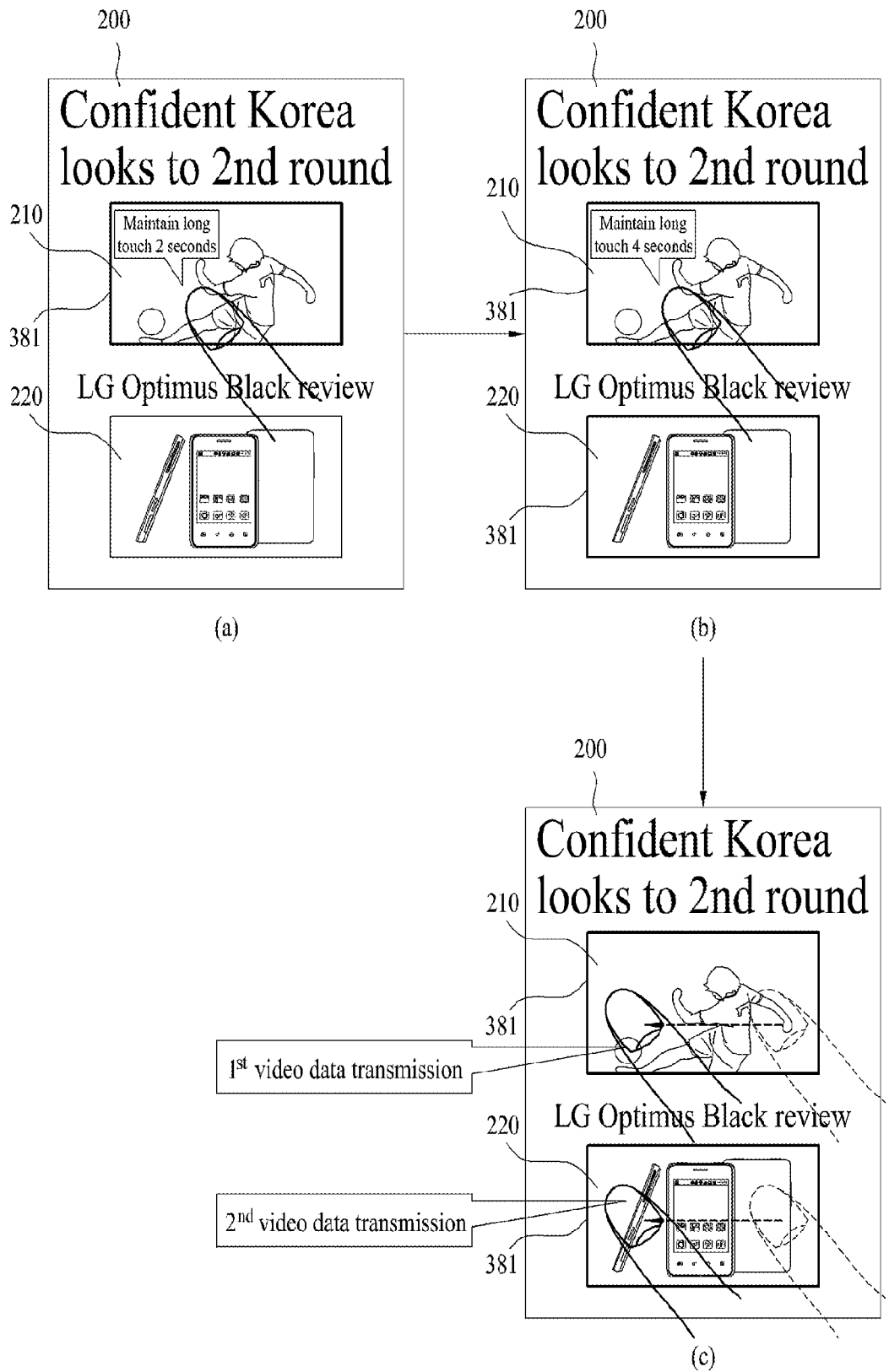

FIG. 22 (a) shows that a $1^{st}$ play region 210 of a $1^{st}$ video and a $2^{nd}$ play region 220 of a $2^{nd}$ video are included in a webpage screen 200.

In doing so, if one (e.g., the $1^{st}$ play region 210, the $2^{nd}$ play region 210, etc.) of the $1^{st}$ play region 210 and the $2^{nd}$ play region 220 is long touched, the controller 180 controls a highlight 381 of a $1^{st}$ color to be displayed on an outline of the $1^{st}$ play region 210.

Referring to FIG. 22 (b), if the long touch inputted to the $1^{st}$ play region 210 is maintained continuously, the controller 180 controls the highlight 381 to be displayed on an outline of the $2^{nd}$ play region 220.

In particular, the state, in which the highlight 381 is displayed on the outline of the $1^{st}/2^{nd}$ play region 210/220, means the state in which the corresponding video data can be transmitted in case of inputting a drag touch to the $1^{st}/2^{nd}$ play region 210/220.

Therefore, referring to FIG. 22 (c), if the drag touch is inputted to the $1^{st}$ play region 210 on which the highlight 381 is displayed, the controller 180 transmits the $1^{st}$ video data displayed on the $1^{st}$ play region 210 to the at least one external device by real time.

If the drag touch is inputted to the $2^{nd}$ play region 220 on which the highlight 381 is displayed, the controller 180 transmits the $2^{nd}$ video data displayed on the $2^{nd}$ play region 220 to the at least one external device by real time.

If the drag touch is inputted to each of the $1^{st}$ play region 210 and the $2^{nd}$ play region 220 consecutively, the controller 180 transmits both of the $1^{st}$ video data and the $2^{nd}$ video data to the at least one external device by real time and is able to control the at least one external device to display both of the $1^{st}$ video data and the $2^{nd}$ video data together, as mentioned in the foregoing description with reference to FIG. 16.

Figure 23:
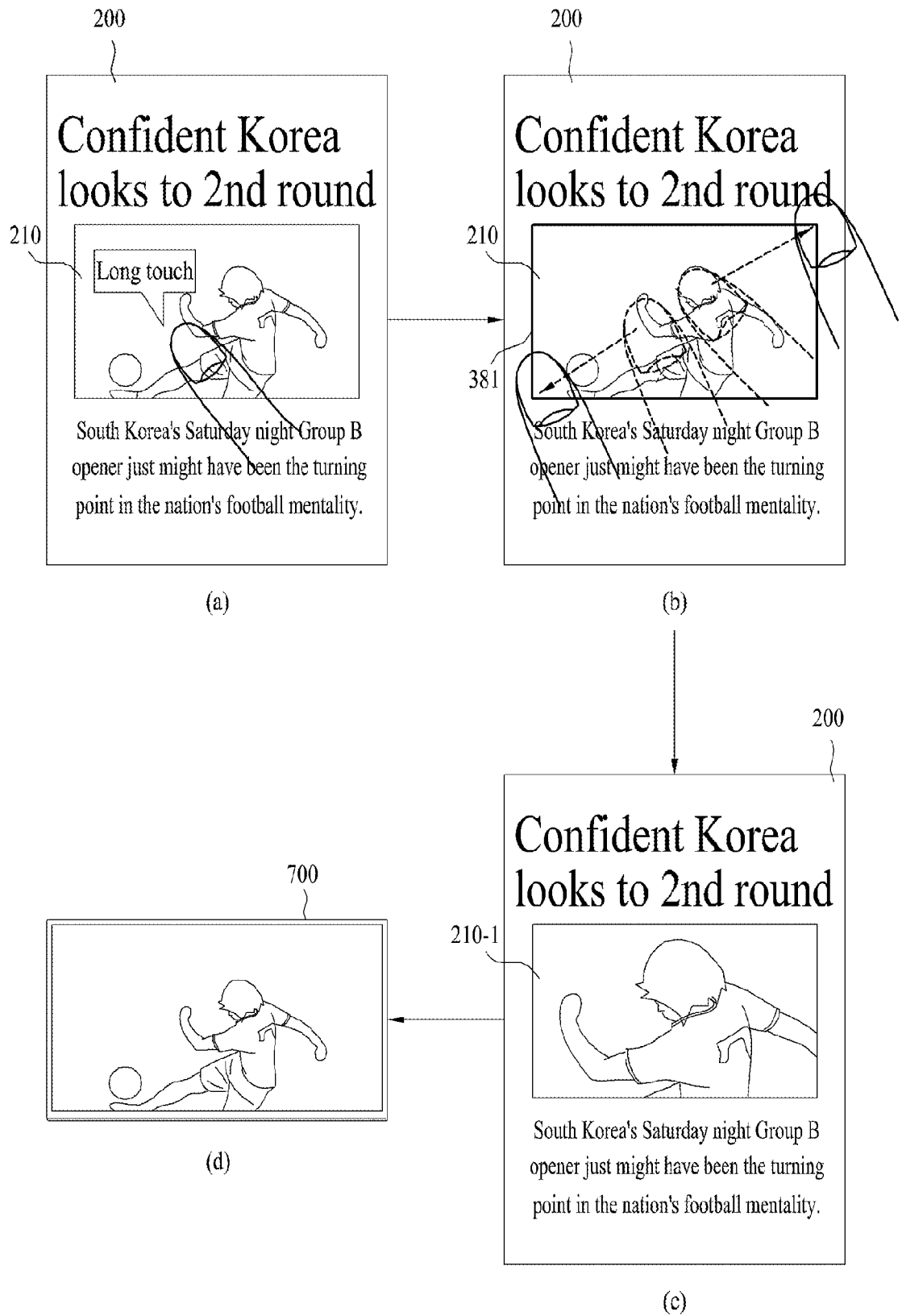

Meanwhile, referring to FIG. 23, while a video is being displayed within a webpage screen 200, if a play region 210 of the video is initially long touched, the controller 180 controls a highlight 321 of a $1^{st}$ color to be displayed on an outline of the play region 210 of the video as information indicating that video data displayed on the play region 210 can be transmitted to the at least one external device 700 [FIG. 23 (a)].

Subsequently, if a touch gesture for enlarging an image displayed on the video play region 210 is inputted to the video play region 210 [FIG. 23 (b)], the controller 180 controls an image 210-1, which is enlarged in response to the inputted touch gesture, to be displayed on the play region 210 [FIG. 23 (c)] and transmits the video data displayed on the video play region 210 to the at least one external device 700 by real time [FIG. 23 (d)].

For instance, in FIG. 23, the touch gesture for the image enlargement may include a pinching-out touch gesture. In this case, the pinching-out touch gesture may include a touch gesture performed in a manner of touching two points of the play region 210 and then increasing a distance between the touched two points. In particular, as the distance between the two points increases, the image displayed on the play region 210 becomes enlarged gradually.

In doing so, when the image displayed on the play region 210 is enlarged by a maximum magnifying power in response to the pinching-out touch gesture, the controller 180 may be able to transmit the video data within the play region 210 to the at least one external device by real time.

In particular, a user is able to watch the enlarged image via the mobile terminal 100 and is also able to watch the former image, which is not enlarged, via the external device.

Figure 24:
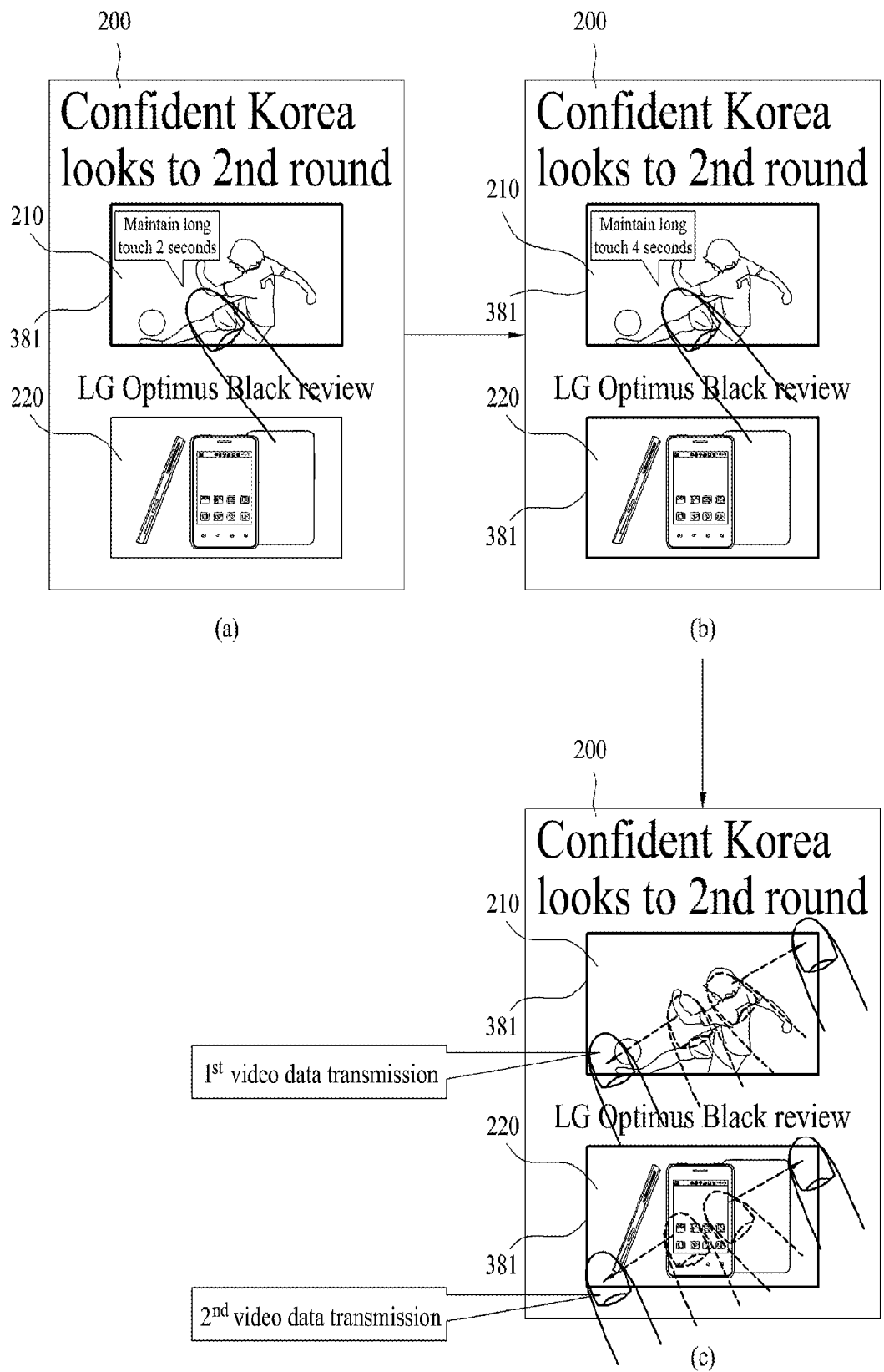

FIG. 24 (a) shows that a $1^{st}$ play region 210 of a $1^{st}$ video and a $2^{nd}$ play region 220 of a $2^{nd}$ video are included in a webpage screen 200.

In doing so, if one (e.g., the $1^{st}$ play region 210, the $2^{nd}$ play region 210, etc.) of the $1^{st}$ play region 210 and the $2^{nd}$ play region 220 is long touched, the controller 180 controls a highlight 381 of a $1^{st}$ color to be displayed on an outline of the $1^{st}$ play region 210.

Referring to FIG. 24 (b), if the long touch inputted to the $1^{st}$ play region 210 is maintained continuously, the controller 180 controls the highlight 381 to be displayed on an outline of the $2^{nd}$ play region 220.

In particular, the state, in which the highlight 381 is displayed on the outline of the $1^{st}/2^{nd}$ play region 210/220, means the state in which the corresponding video data can be transmitted in case of inputting a drag touch to the $1^{st}/2^{nd}$ play region 210/220.

Therefore, referring to FIG. 24 (c), if the pinching-out drag touch is inputted to the $1^{st}$ play region 210 on which the highlight 381 is displayed, the controller 180 transmits the $1^{st}$ video data displayed on the $1^{st}$ play region 210 to the at least one external device by real time.

If the pinching-out drag touch is inputted to the $2^{nd}$ play region 220 on which the highlight 381 is displayed, the controller 180 transmits the $2^{nd}$ video data displayed on the $2^{nd}$ play region 220 to the at least one external device by real time.

If the drag touch is inputted to each of the $1^{st}$ play region 210 and the $2^{nd}$ play region 220 consecutively, the controller 180 transmits both of the $1^{st}$ video data and the $2^{nd}$ video data to the at least one external device by real time and is able to control the at least one external device to display both of the $1^{st}$ video data and the $2^{nd}$ video data together, as mentioned in the foregoing description with reference to FIG. 16.

FIGS. 25 to 28 show one example of a following process. First of all, in case that the content shown in FIG. 5 includes a map configured to indicate a specific area and that a screen including a display region of the map includes a map application screen, a map including a destination found by a user is transmitted to the at least one external device.

Figure 25:
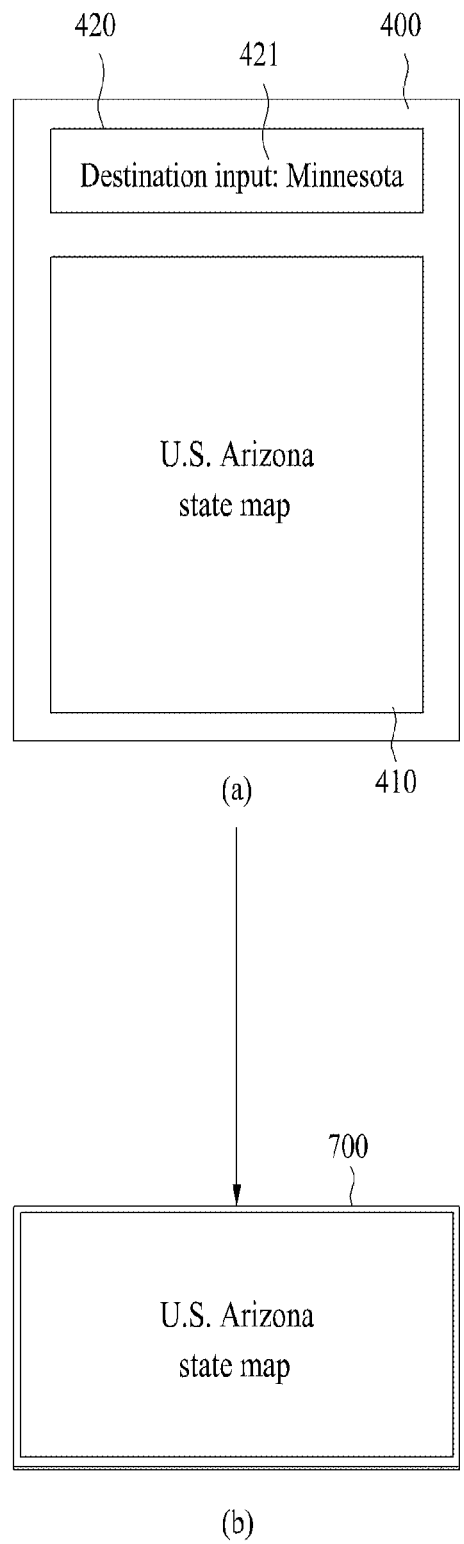

Referring to FIG. 25 (a), while a display region 410 of a $1^{st}$ map indicating a specific area (e.g., Arizona state in U.S.A.) is displayed within a map application screen 400, if a specific destination 421 (e.g., Minnesota) is inputted via a destination input window 420, the controller 180 detects whether a location of the inputted destination 421 deviates from the area of the $1^{st}$ map.

Referring to FIG. 25 (b), since the location of the destination 421 deviates the area indicated by the $1^{st}$ map, if it is necessary to display a $2^{nd}$ map indicating not the specific area but the area of the destination 421 on the display region 410 of the $1^{st}$ map, the controller 180 transmits a display data of the $2^{nd}$ map indicating the area of the destination 421 to the at least one external device so that the at least one external device can display the display data.

Figure 26:
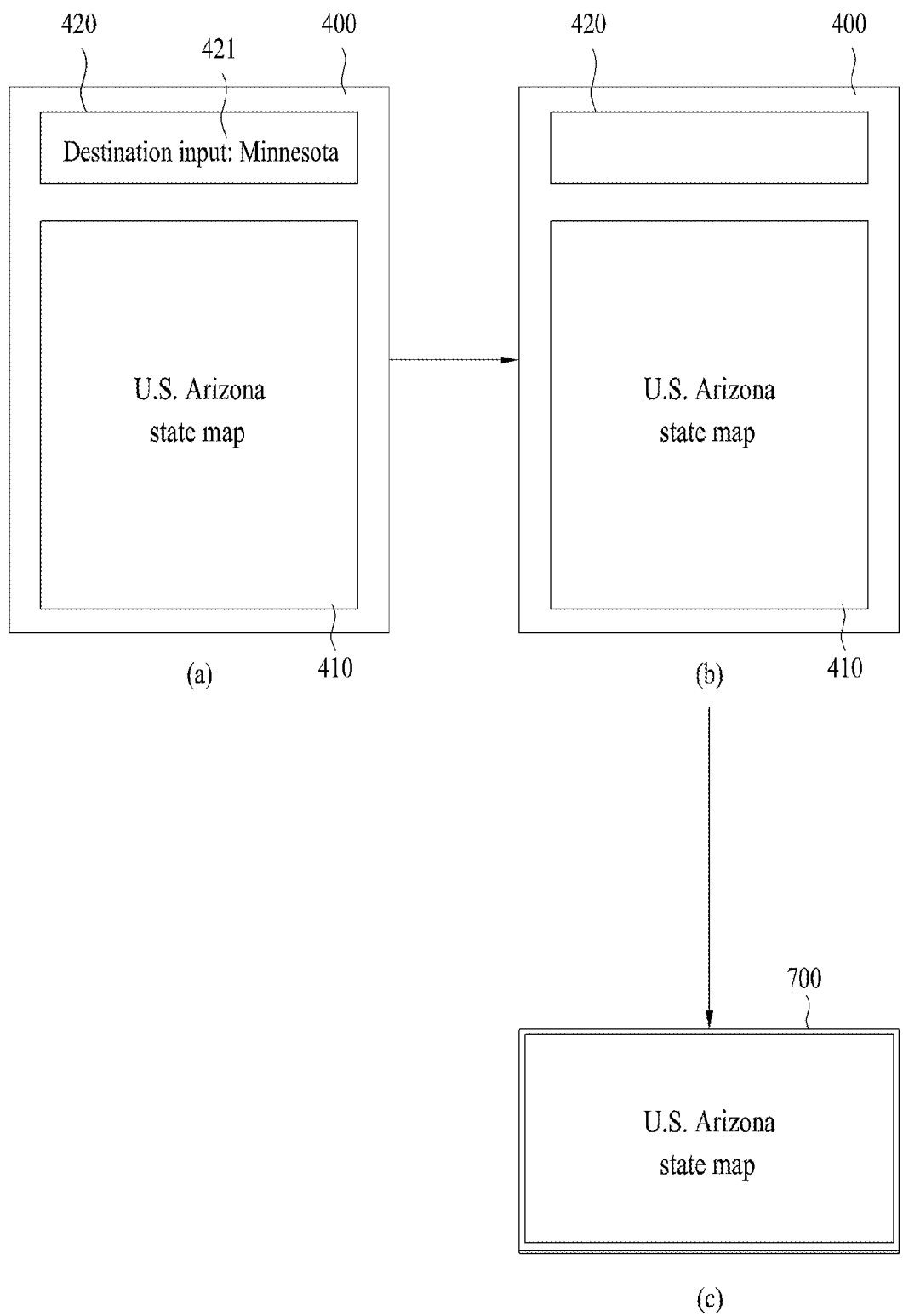

Referring to FIG. 26, if the location of the destination 421 deviates from the area indicated by the 1st map [FIG. 26 (a)], the controller 180 displays the 2nd map indicating not the specific area but the area of the destination 421 on the display region 410 of the 1st map [FIG. 26 (b)]. And, the controller 180 transmits a display data of the 1st map to the at least one external device so that the at least one external device can display the corresponding display data.

Figure 27:
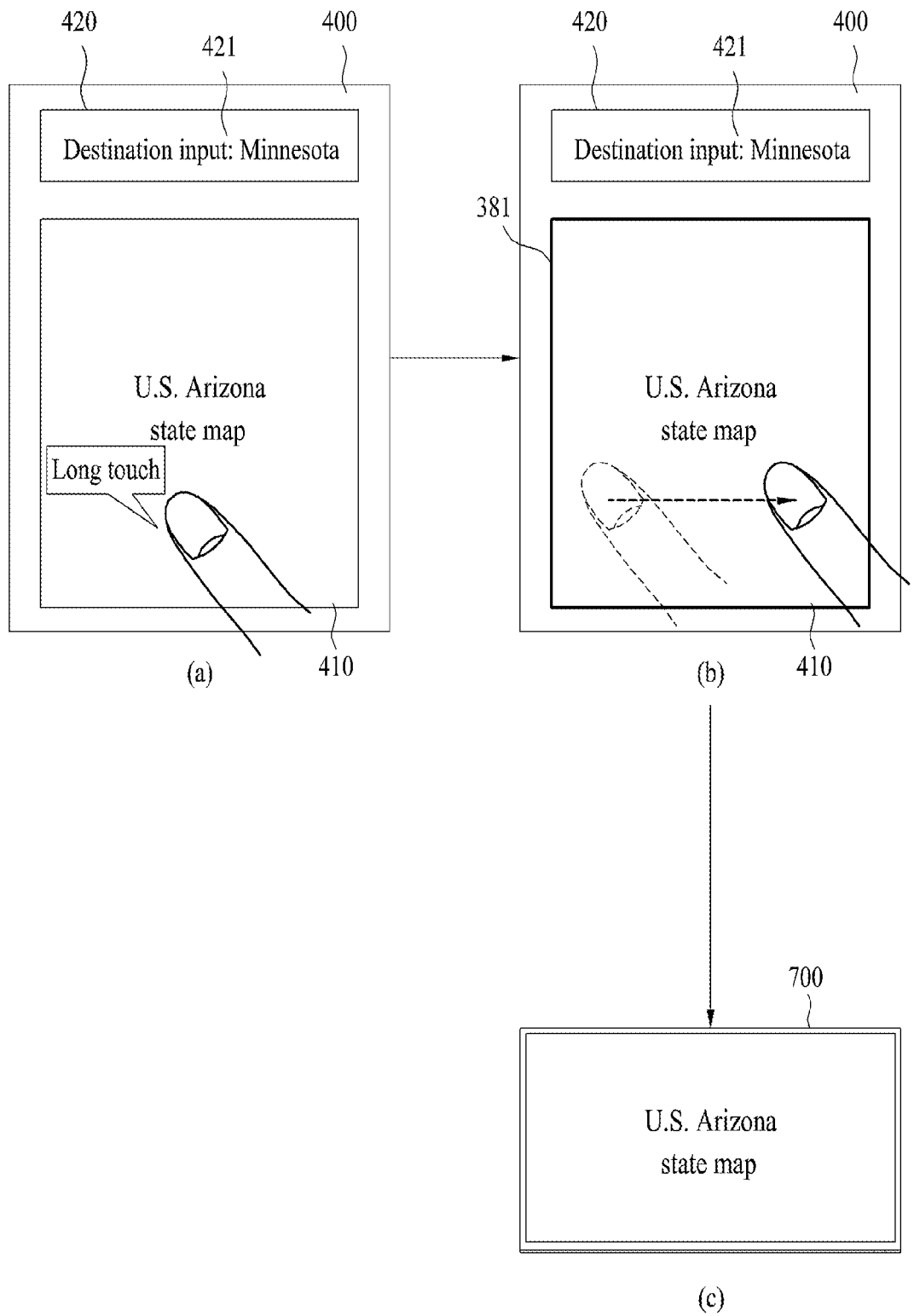

Referring to FIG. 27 (a), while a display region 410 of a 1st map indicating a specific area (e.g., Arizona state in U.S.A.) is displayed within a map application screen 400, if a specific destination 421 (e.g., Minnesota) is inputted via a destination input window 420 and the display region 410 of the 1st map is then long touched, the controller 180 detects whether a location of the inputted destination 421 deviates from the area of the 1st map.

Referring to FIG. 27 (b), since the location of the destination 421 deviates the area indicated by the 1st map, if it is necessary to display a 2nd map indicating not the specific area but the area of the destination 421 on the display region 410 of the 1st map, the controller 180 controls a highlight 381 indicating the necessity to be displayed on the display region 410 of the 1st map.

Referring to FIG. 27 (c), while the highlight 381 is displayed, if a drag touch is inputted to the display region 410 of the 1st map, the controller 180 transmits a display data of the 2nd map indicating the area of the destination 421 to the at least one external device so that the at least one external device can display the corresponding display data.

Figure 28:
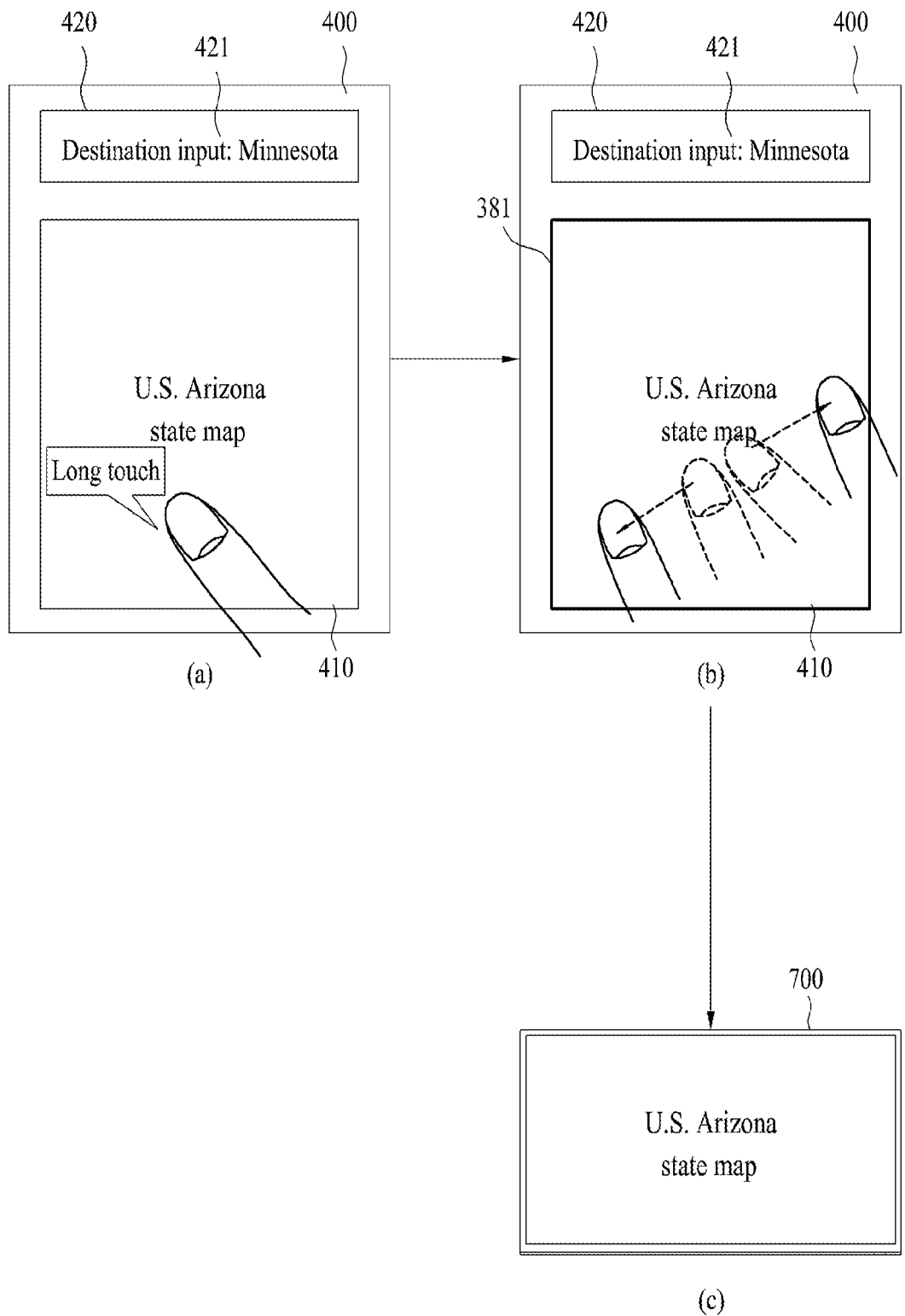

Referring to FIG. 28 (a), while a display region 410 of a 1st map indicating a specific area (e.g., Arizona state in U.S.A.) is displayed within a map application screen 400, if a specific destination 421 (e.g., Minnesota) is inputted via a destination input window 420 and the display region 410 of the 1st map is then long touched, the controller 180 detects whether a location of the inputted destination 421 deviates from the area of the 1st map.

Referring to FIG. 28 (b), since the location of the destination 421 deviates the area indicated by the 1st map, if it is necessary to display a 2nd map indicating not the specific area but the area of the destination 421 on the display region 410 of the 1st map, the controller 180 controls a highlight 381 indicating the necessity to be displayed on the display region 410 of the 1st map.

Referring to FIG. 28 (c), while the highlight 381 is displayed, if a pinching-out touch gesture is inputted to the display region 410 of the 1st map, the controller 180 transmits a display data of the 2nd map indicating the area of the destination 421 to the at least one external device so that the at least one external device can display the corresponding display data.

Meanwhile, the controller 180 may be able to perform operations resulting from combinations of the contents described with reference to FIGS. 6 to 24 prior to the contents described with reference to FIGS. 25 to 28.

Figure 29:
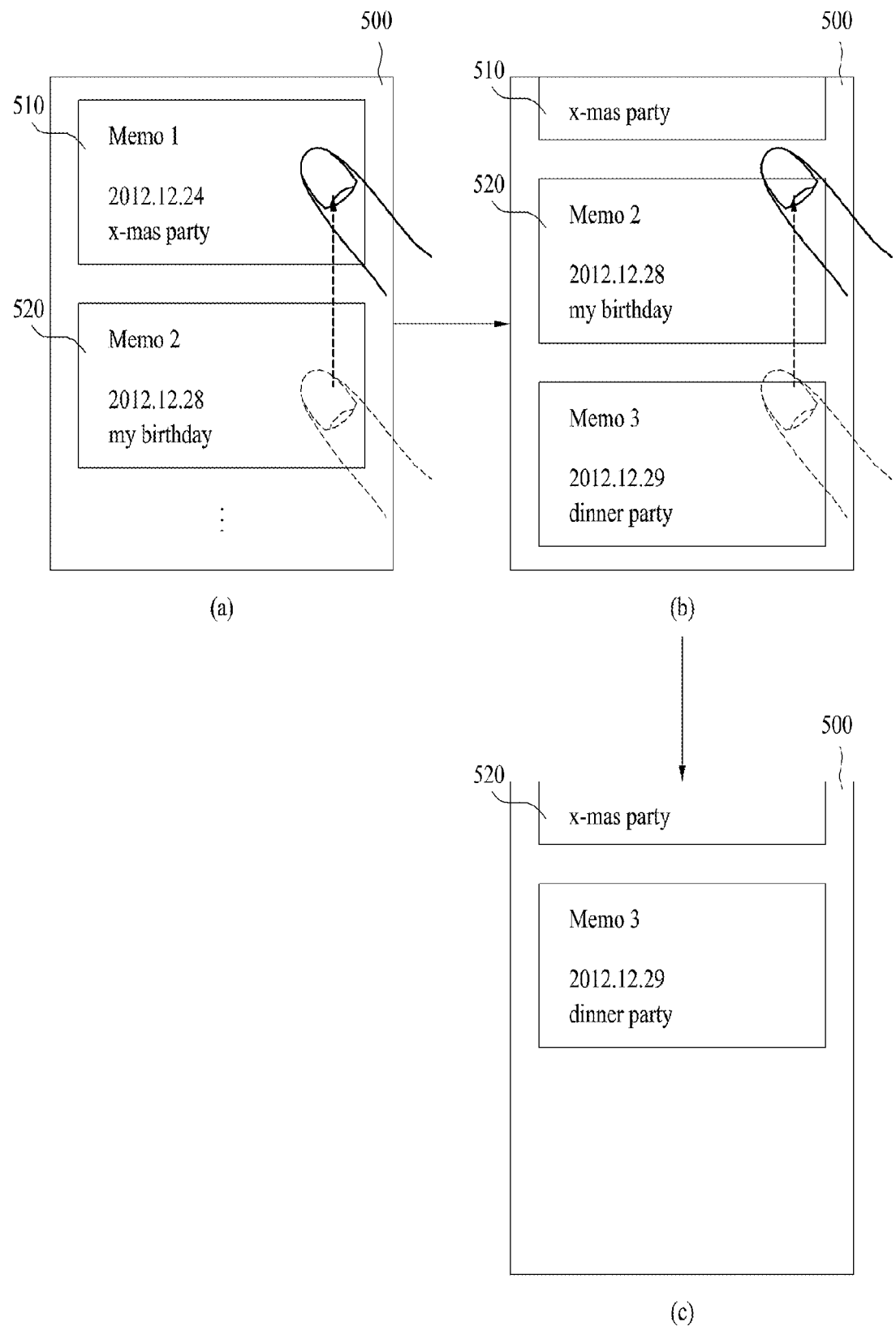

FIG. 29 and FIG. 30 show one example of a following process. First of all, the content shown in FIG. 5 includes at least one memo and a screen including a display region of the at least one memo includes a memo screen. Secondly, display of the at least one memo is transmitted to the at least one external device.

Referring to FIG. 29 (a), a display region 510 of a 1st memo, a display region 520 of a 2nd memo and the like are included in a memo screen 500.

Referring to FIG. 29 (b), as the memo screen 500 is scrolled, if a portion of the display region 510 of the 1st memo disappears from the memo screen 500, the controller 180 transmits a 1st display data displayed on the display region 510 of the 1st memo to the at least one external device.

Referring to FIG. 29 (c), as the memo screen 500 is scrolled again, if a portion of the display region 520 of the 2nd memo disappears from the memo screen 500, the controller 180 transmits a 2nd display data displayed on the display region 520 of the 2nd memo to the at least one external device.

Meanwhile, referring to FIG. 30, the controller 180 may control the at least one external device to display the 1st and 2nd display data transmitted by real time in various display ways.

In particular, referring to FIG. 30 (a), the controller 180 generates a signal for commanding the at least one external device 700 to partition the screen of the display unit 750 into a 1st region and a 2nd region and to display the transmitted 1st and 2nd display data 511 and 512 on the 1st and 2nd regions, respectively and is then able to transmit the generated signal to the at least one external device 700 together with the 1st and 2nd display data 511 and 512.

Referring to FIG. 30 (b), the controller 180 generates a signal for commanding the at least one external device 700 to display the transmitted 1st display data 511 on the whole screen and to display the transmitted 2nd display data 521 on a portion of the screen and is then able to transmit the generated signal together with the 1st and 2nd display data 511 and 512.

Referring to FIG. 30 (c), the controller 180 generates a signal for commanding the at least one external device 700 to display the transmitted 2nd display data 521 on the whole screen and to display the transmitted 1st display data 351 on a portion of the screen and is then able to transmit the generated signal together with the 1st and 2nd display data 511 and 521.

Meanwhile, the controller 180 may be able to perform operations resulting from combinations of the contents described with reference to FIGS. 6 to 24 prior to the contents described with reference to FIG. 29 and FIG. 30.

Accordingly, the present invention provides the following effects and/or advantages.

First of all, as a screen including a play region of content is scrolled, a portion of the play region may disappear from the screen. Even if the portion of the play region disappears from the screen, video data displayed on the play region is transmitted to an external device capable of displaying the video data by real time. Therefore, the present invention enables a user to keep watching the content via the external device despite that the play region of the content disappears from the screen.

Effects obtainable from the present invention may be non-limited by the above mentioned effect. And, other unmentioned effects can be clearly understood from the following description by those having ordinary skill in the technical field to which the present invention pertains.

It will be appreciated by those skilled in the art that the present invention can be specified into other form(s) without departing from the spirit or scope of the inventions.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a display unit configured to display a screen including a play region for at least one content;

a wireless communication unit configured to establish wireless communication with at least one external device, and to transmit video data displayed on the play region to the at least one external device in order to display the transmitted video data; and a controller configured to control the wireless communication unit to transmit the video data to the at least one external device in real time if a portion of the play region disappears from the screen in response to a scroll of the screen.

2. The mobile terminal of claim 1, wherein if the play region is selected, the controller is configured to:
search for at least one communication-connectable external device via the established wireless communication;
display a list on the screen that includes a found at least one communication-connectable external device; and
connect, via the established wireless communication, with the found at least one communication-connectable external device selected from the list.

3. The mobile terminal of claim 1, wherein if a portion of the play region disappears, the controller is configured to:
search for at least one communication-connectable external device via the established wireless communication;
display a list on the screen that includes a found at least one communication-connectable external device;
connect, via the established wireless communication, with the found at least one communication-connectable external device selected from the list; and
transmit the video data to the found at least one communication connected external device in real time.

4. The mobile terminal of claim 1, wherein the controller is further configured to display information indicating that the video data is transmittable to the at least one external device if the at least one content is played.

5. The mobile terminal of claim 1, wherein the controller is further configured to:
display information indicating that the video data is transmittable to the at least one external device if a size of the disappearing portion of the play region becomes equal to or smaller than a preset size by the scroll; and
transmit the video data to the at least one external device in real time if the size of the disappearing portion of the play region progressively becomes equal to or greater than the preset size by the scroll.

6. The mobile terminal of claim 1, wherein the controller is further configured to:
display a setting window for setting whether to transmit the video data if a portion of the play region disappears; and
perform an operation responsive to a selection via the setting window.

7. The mobile terminal of claim 1, wherein the controller is further configured to:
control the play region to disappear from the screen, if the video data is transmitted to the at least one external device; and
display additional information in response to the scroll on at least a space within the screen from which the play region has disappeared.

8. The mobile terminal of claim 1, wherein the controller is further configured to control the wireless communication unit to stop the real-time transmission of the video data while the video data is being transmitted to the at least one external device if the portion of the play region having disappeared from the screen reappears.

9. The mobile terminal of claim 8, wherein the controller is further configured to:
display information indicating that the transmission of the video data is stoppable if the disappearing portion of the play region reappears as a size equal to or smaller than a preset size; and
stop the real-time transmission of the video data if the reappearing portion of the play region increases to a size equal to or greater than the preset size.

10. The mobile terminal of claim 8, wherein the controller is further configured to:
display a setting window for setting whether to stop the transmission of the video data if the disappearing portion of the play region reappears; and to
perform an operation responsive to a selection via the setting window.

11. The mobile terminal of claim 1, wherein the display unit comprises a touchscreen and wherein the controller is further configured to control the wireless communication unit to transmit the video data to the at least one external device in real time if a preset touch gesture is applied to the play region.

12. The mobile terminal of claim 11, wherein the controller is further configured to:
display information indicating that the video data is transmittable to the at least one external device if a long touch is applied to the play region; and
transmit the video data to the at least one external device in real time if a drag touch in a specific direction is applied to the play region while the information is being displayed.

13. The mobile terminal of claim 12, wherein the wireless communication unit is further configured to establish wireless connections with a first external device and a second external device located in a different direction relative to the first external device, and wherein the controller is further configured to transmit the video data in real time to the first external device or the second external device that is located in the direction of the drag touch.

14. The mobile terminal of claim 11, wherein the preset touch gesture comprises a touch gesture for enlarging an image displayed on the play region and the controller is further configured to transmit the video data to the external device in real time if the image is enlarged by a preset magnifying power in response to the touch gesture.

15. The mobile terminal of claim 1, wherein the controller is further configured to:
cause the play region comprising new content to appear within the screen in response to the scroll of the screen; and
control the wireless communication unit to transmit other video data displayed on the play region comprising the new content to the at least one external device in real time in order to enable the at least one external device to display the other video data if the screen is scrolled again to cause a portion of the play region comprising the new content to disappear.

16. The mobile terminal of claim 15, wherein the controller is further configured to transmit a signal for commanding the at least one external device to partition a screen into a first region and a second region and to display the transmitted video data on the first region and the other video data on the second region.

17. The mobile terminal of claim 1, wherein the screen comprises a first play region and a second play region and the controller is further configured to control the wireless communication unit to transmit first video data displayed on the first play region and second video data displayed on the second play region to the at least one external device in order to enable the external device to display the first video data and the second video data if a portion of the first play region and a portion of the second play region disappear from the screen in response to a scroll of the screen.

18. The mobile terminal of claim 17, wherein the controller is further configured to transmit a signal when the first video data and the second video data are transmitted to the at least one external device for commanding the at least one external device to partition a screen into a first region and a second region and to display the first video data on the first region and the second video data on the second region.

19. The mobile terminal of claim 17, wherein the controller is further configured to transmit a signal to the at least one external device for commanding the at least one external device to display one of the first video data and the second video data on a whole screen and to display the other of the first video data and the second video data overlaid on a portion of the whole screen when the first video data and the second video data are transmitted.

20. A method of controlling a mobile terminal, the method comprising:
  displaying a screen including a play region for at least one content comprising video data;
  establishing communication with at least one external device;
  detecting whether a portion of the play region disappears from the screen in response to a scroll of the screen; and
  transmitting the video data to the at least one external device in real time in response to the portion of the play region disappearing in order to enable the external device to display the video data.

* * * * *